(12) United States Patent
Masumiya et al.

(10) Patent No.: US 10,042,348 B2
(45) Date of Patent: Aug. 7, 2018

(54) TOOL PATH-GENERATING METHOD, MACHINE TOOL CONTROL DEVICE AND TOOL PATH-GENERATING DEVICE

(71) Applicant: MAKINO MILLING MACHINE CO., LTD., Tokyo (JP)

(72) Inventors: Yasunori Masumiya, Aiko-gun (JP); Keitaro Suzuki, Aiko-gun (JP); Kyohei Suzuki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 130 days.

(21) Appl. No.: 14/435,104

(22) PCT Filed: Oct. 11, 2012

(86) PCT No.: PCT/JP2012/076348
§ 371 (c)(1),
(2) Date: Apr. 10, 2015

(87) PCT Pub. No.: WO2014/057562
PCT Pub. Date: Apr. 17, 2014

(65) Prior Publication Data
US 2015/0234374 A1 Aug. 20, 2015

(51) Int. Cl.
*G05B 19/19* (2006.01)
(52) U.S. Cl.
CPC .... *G05B 19/19* (2013.01); *G05B 2219/35167* (2013.01)
(58) Field of Classification Search
CPC .............. G05B 19/19; G05B 2219/35167
(Continued)

(56) References Cited

U.S. PATENT DOCUMENTS 4,972,322 A * 11/1990 Asakura ............ G05B 19/40938
318/568.1
5,091,861 A * 2/1992 Geller ................... B23B 31/265
700/192

(Continued)

FOREIGN PATENT DOCUMENTS

| CN | 104487193 | 4/2015 |
| EP | 2 208 572 | 7/2010 |

(Continued)

OTHER PUBLICATIONS

International Search Report dated Dec. 18, 2012, directed towards International Application No. PCT/JP2012/076348, 2 pages.

(Continued)

*Primary Examiner* — Thomas C Lee
*Assistant Examiner* — Alan Chu
(74) *Attorney, Agent, or Firm* — Morrison & Foerster LLP

(57) ABSTRACT

A tool path-generating method for computing a tool path to process a workpiece, wherein the tool path for a designated tool when processing using the designated tool is previously established. The tool path-generating method includes a path-computing process for computing, on the basis of the tool path for the designated tool, the tool path of a substitute tool differing from the designated tool when processing with the substitute tool. The path-computing process computes the portion that ultimately forms the machined surface when the workpiece is processed using the designated tool and sets the tool path for the substitute tool on the basis of the portion that ultimately forms the machined surface.

9 Claims, 23 Drawing Sheets

(58) Field of Classification Search
USPC ... 700/61, 86, 160, 169, 179, 184, 190, 192, 700/253, 186
See application file for complete search history.

(56) References Cited

U.S. PATENT DOCUMENTS

| | | | | |
|---|---|---|---|---|
| 5,249,135 | A * | 9/1993 | Fujita | G05B 19/40937 700/179 |
| 5,808,432 | A * | 9/1998 | Inoue | G05B 19/4069 318/561 |
| 6,223,095 | B1 * | 4/2001 | Yamazaki | G05B 19/40937 700/187 |
| 2009/0125138 | A1 * | 5/2009 | Muller | B23F 5/20 700/103 |
| 2010/0094450 | A1 * | 4/2010 | Zhao | G05B 19/4097 700/182 |
| 2011/0118866 | A1 * | 5/2011 | Bandini | G05B 19/40937 700/183 |
| 2013/0253695 | A1 | 9/2013 | Iuchi et al. | |
| 2014/0088929 | A1 * | 3/2014 | Suttin, Sr. | G06F 17/50 703/1 |
| 2015/0151445 | A1 | 6/2015 | Masumiya et al. | |

FOREIGN PATENT DOCUMENTS

| | | |
|---|---|---|
| EP | 2 868 412 | 5/2015 |
| JP | 1-282610 | 11/1989 |
| JP | 4-25344 | 1/1992 |
| JP | 4-82648 | 3/1992 |
| JP | 6-91477 | 4/1994 |
| JP | 2000-190166 | 7/2000 |
| JP | 2007-200121 | 8/2007 |
| JP | 2012-161861 | 8/2012 |
| WO | WO-2012/101789 | 8/2012 |

OTHER PUBLICATIONS

Fussell, B. K. et al. (Apr. 2003). "Modeling of cutting geometry and forces for 5-axis sculptured surface machining," 35(4):333-346.

* cited by examiner

TOOL PATH-GENERATING METHOD, MACHINE TOOL CONTROL DEVICE AND TOOL PATH-GENERATING DEVICE

CROSS-REFERENCE TO RELATED APPLICATIONS

This application is a U.S. National Phase patent application of International Patent Application No. PCT/JP2012/076348, filed on Oct. 11, 2012, which is hereby incorporated by reference in the present disclosure in its entirety.

FIELD OF THE INVENTION

The present invention relates to a tool path generation method, a control device of a machine tool, and a tool path generation device.

BACKGROUND OF THE INVENTION

A machine tool which performs machining, such as cutting, by moving a tool relative to a workpiece is known in a conventional technique. In such a machine tool, a numerical control-type machine tool is known which specifies a path of a tool by coordinates of a predetermined axis or the like and machines a workpiece by automatically moving the tool with respect to a workpiece. A tool used to machine a workpiece is appropriately selected depending on a machining shape of the workpiece. For example, when a groove portion is formed on a surface of a workpiece, a flat end mill or the like is used as a tool. In addition, when a plurality of types of machining is performed on a single workpiece, the machining can be performed by exchanging tools according to machining shapes of the workpiece.

The patent literature 1 discloses a machine tool which selects an optimum using tool based on various condition data for machining a workpiece. The machine tool includes an automatic tool allocation determination means which allocates a tool to a tool station of edged tools and an automatic programming device of the machine tool which automatically generates a machining program. The automatic programming device determines when an optimum tool is different from a tool allocated by the machining program to a last workpiece, whether the last allocated tool can be used in place of the optimum tool. Further, it is disclosed that the automatic programming device allocates a substitute tool when the last allocated tool can be used in place of the optimum tool.

Patent literature 1: Japanese Laid-open Patent Publication No. 4-25344

SUMMARY OF THE INVENTION

A tool which machines a workpiece while moving relative to a workpiece is specified by a user or the like. A tool path when a specified tool which is specified in advance is used is calculated. Regarding a type and a size of a tool used for machining of a workpiece, it is preferable to use an optimum tool depending on a type of machining. For example, when a cylindrical cam is manufactured, a groove portion is formed on a surface of a columnar workpiece. In this case, it is preferable to use a rotary tool having a diameter identical to a groove width. When a flat end mill is used as the rotary tool, it is preferable to use a flat end mill having a tool diameter identical to a groove width. However, there are various machining shapes of the workpiece, and there is a problem that an optimum tool needs to be prepared depending on a machining shape. In addition, if an optimum tool is prepared, there is a problem that it is difficult to perform a fine adjustment of a machining dimension when the tool is worn or the like.

A numerical control-type machine tool is sometimes able to perform machining using a substitute tool of which size is different from a specified tool. For example, when a rotary tool having a tool diameter smaller than that of a specified rotary tool is used, machining can be performed by generating a tool path parallely moved by a predetermined amount with respect to a tool path of the specified tool. In other words, the machining can be performed using an offset function of parallely moving a tool path by considering a difference between the tool diameters.

However, depending on a tool type, it is difficult to generate a tool path when the tool is changed, and the offset function may not be used. When the offset function is used in the machining, machining accuracy may become lower or a machining time may become longer than when the machining is performed by the optimum tool. In addition, when the offset function is used, there is a problem that the tool type is unchangeable. Further, when a three-dimensional tool path is generated, a machining program needs to include a description of a normal vector perpendicular to a cutting surface.

A tool path generation method of the present invention is a tool path generation method for calculating a tool path for machining a workpiece while relatively moving a tool and the workpiece, in which a tool path of a specified tool when the specified tool is used in machining is set in advance, and which includes a tool path calculation step for calculating a tool path of a substitute tool when the substitute tool different from the specified tool machines based on the tool path of the specified tool. The tool path calculation step calculates a portion which finally generates a machining surface in a machining area of the specified tool when the specified tool machines the workpiece and sets the tool path of the substitute tool based on the portion which finally generates the machining surface.

According to the above-described invention, the portion which finally generates the machining surface can include a line portion or a plane portion.

According to the above-described invention, machining can be performed using the substitute tool which is a same type of tool as the specified tool and is smaller than the specified tool.

According to the above-described invention, the tool path calculation step can include a step for setting a virtual advancing direction when the specified tool machines the workpiece, a step for calculating the portion which finally generates the machining surface using the virtual advancing direction, a step for setting a range in which the substitute tool is disposed based on the portion which finally generates the machining surface, and a step for setting a plurality of positions on which the substitute tool is disposed within the range in which the substitute tool is disposed.

A control device of a machine tool of the present invention is a control device of a machine tool which machines a workpiece while relatively moving a tool and the workpiece and comprises an input information reading unit configured to read input information including a tool path of a specified tool when the specified tool which is specified in advance machines a workpiece and a path setting unit configured to set a tool path of a substitute tool based on the input information when the substitute tool different from the specified tool performs machining. The path setting unit calculates a portion which finally generates a machining surface in a machining area of the specified tool when the specified tool machines the workpiece and sets the tool path of the substitute tool based on the portion which finally generates the machining surface.

According to the above-described invention, the portion which finally generates the machining surface can include a line portion or a plane portion.

According to the above-described invention, the substitute tool is a same type of tool as the specified tool and is smaller than the specified tool.

According to the above-described invention, the path setting unit can include a virtual advancing direction setting unit configured to set a virtual advancing direction when the specified tool machines the workpiece based on the input information, a range setting unit configured to calculate the portion which finally generates the machining surface using the virtual advancing direction and set a range in which the substitute tool is disposed based on the portion which finally generates the machining surface, and a position setting unit configured to set a plurality of positions on which the substitute tool is disposed within the range in which the substitute tool is disposed.

A tool path generation device of the present invention is a tool path generation device which generates a tool path when a workpiece is machined while relatively moving a tool and the workpiece and includes a shape data reading unit configured to read shape data of the workpiece and a path setting unit configured to set a tool path of a substitute tool based on the shape data when the substitute tool different from a specified tool which is specified in advance performs machining. The path setting unit sets a tool path of the specified tool when the specified tool machines the workpiece, calculates a portion which finally generates a machining surface in a machining area of the specified tool when the specified tool performs machining, and sets the tool path of the substitute tool based on the portion which finally generates the machining surface.

According to the present invention, machining can be accurately performed using a substitute tool in place of a specified tool which is specified to perform desired machining.

DETAILED DESCRIPTION OF THE INVENTION

First Embodiment

A tool path generation method, a control device of a machine tool, and a tool path generation device according to the first embodiment are described with reference to FIG. 1 to FIG. 28. As the machine tool of the present embodiment, a horizontal machining center in which a spindle extends in a horizontal direction is described as an example. In the present embodiment, grooving which forms a groove portion on a workpiece is described as an example. When a workpiece is machined, it is preferable to use a tool having an optimum type and optimum size to machine the workpiece into a desired shape. A user can specify the optimum tool as a specified tool. In the present embodiment, a substitute tool smaller than the specified tool is used for grooving in place of the specified tool which is specified by the user.

Figure 1:
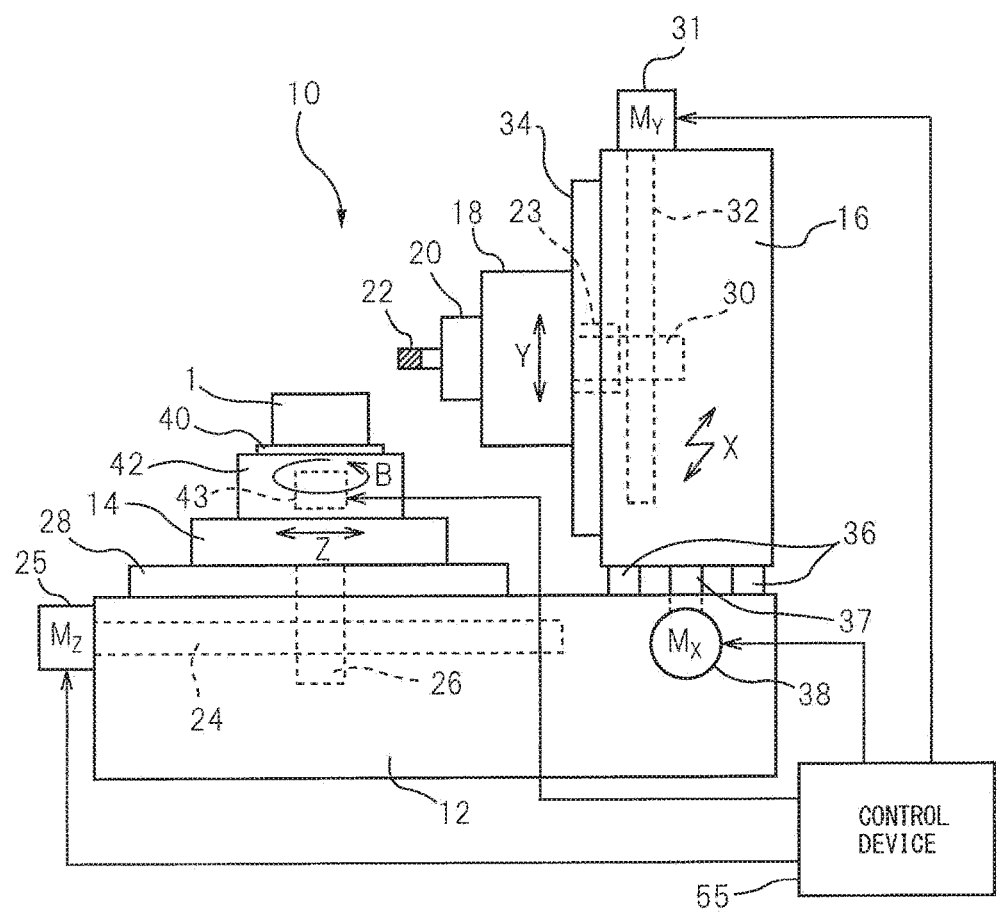
FIG. 1 is a schematic view of a numerical control-type machine tool in a first embodiment.

FIG. 1 is a schematic view of a numerical control-type machine tool according to the present embodiment. A substitute tool 22 is mounted as a tool on a machine tool 10 illustrated in FIG. 1. The machine tool 10 of the present embodiment includes a moving device which relatively moves the substitute tool 22 and a workpiece 1. The machine tool 10 includes a bed 12 disposed on a floor of a factory or the like. A Z-axis guide rail 28 is fixed to an upper surface of the bed 12. The Z axis of the present embodiment is the horizontal direction. The Z-axis guide rail 28 is disposed to extend in a Z-axis direction (a right and left direction in FIG. 1).

A table 14 is disposed on an upper surface of the Z-axis guide rail 28. The table 14 is slidably disposed to the Z-axis guide rail 28. The table 14 moves along the Z axis. A numerical control-type rotary table 42 for rotating the workpiece 1 in a B-axis direction is disposed on an upper surface of the table 14. The workpiece 1 is fixed to an upper surface of the rotary table 42 via a workpiece holding member 40.

An X-axis guide rail 36 is fixed to an upper surface of the bed 12. An X axis of the present embodiment is perpendicular to the Z axis and extends in the horizontal direction (a vertical direction of a paper surface of FIG. 1). The X-axis guide rail 36 is formed to extend along the X axis. A column 16 is slidably disposed on the X-axis guide rail 36. The column 16 moves along the X axis.

A Y-axis guide rail 34 is fixed to a front surface of the column 16. The front surface faces to the workpiece 1. A Y axis of the present embodiment extends in a direction perpendicular to the X axis and the Z axis. The Y-axis guide rail 34 extends along the Y axis. A spindle head 18 is disposed on the Y-axis guide rail 34. The spindle head 18 is slidably formed to the Y-axis guide rail 34. The spindle head 18 moves along the Y axis. The spindle head 18 is formed to rotatably support a spindle 20.

The moving device of the present embodiment includes a Z-axis moving device which relatively moves the substitute tool 22 to the workpiece 1 in the Z-axis direction. In the present embodiment, a Z-axis feed screw 24 is disposed below the table 14 inside the bed 12. The Z-axis feed screw 24 extends in the Z-axis direction. A nut 26 is fixed to a lower surface of the table 14. The nut 26 is screwed to the Z-axis feed screw 24. One end of the Z-axis feed screw 24 is connected to a Z-axis servomotor 25. The Z-axis servomotor 25 is driven to rotate the Z-axis feed screw 24, and thus the nut 26 moves in the Z-axis direction. The table 14 moves along the Z-axis guide rail 28 in conjunction with the movement of the nut 26. Accordingly, the workpiece 1 moves in the Z-axis direction.

The machine tool 10 of the present embodiment includes an X-axis moving device which makes the substitute tool 22 to move relative to the workpiece 1 in the X-axis direction. The X-axis moving device includes an X-axis feed screw disposed below the column 16 inside the bed 12, similar to the Z-axis moving device. The X-axis feed screw is formed to extend in the X-axis direction. A nut 37 screwed to the X-axis feed screw is fixed to a lower surface of the column 16. One end of the X-axis feed screw is connected to an X-axis servomotor 38. The X-axis servomotor 38 is driven to rotate the X-axis feed screw, and thus the nut 37 moves in the X-axis direction. The column 16 moves along the X-axis guide rail 36 in conjunction with the movement of the nut 37. Accordingly, the substitute tool 22 moves in the X-axis direction.

The machine tool 10 of the present embodiment includes a Y-axis moving device which makes the substitute tool 22 to move relative to the workpiece 1 in a Y-axis direction. A Y-axis feed screw 32 is disposed inside the column 16. The Y-axis feed screw 32 is formed to extend in the Y-axis direction. A nut 30 which is screwed to the Y-axis feed screw 32 is fixed to a back surface of the spindle head 18. An upper end of the Y-axis feed screw 32 is connected to a Y-axis servomotor 31. The Y-axis servomotor 31 is driven to rotate the Y-axis feed screw 32, and thus the nut 30 moves in the Y-axis direction. The spindle head 18 moves along the Y-axis guide rail 34 in conjunction with the movement of the nut 30. Accordingly, the substitute tool 22 moves in the Y-axis direction.

The machine tool 10 of the present embodiment includes a B-axis moving device which makes the substitute tool 22 to move relative to the workpiece 1 in the B-axis direction. The rotary table 42 includes a B-axis servomotor 43 which rotate the workpiece 1. The B-axis servomotor 43 is driven, and thus the workpiece 1 rotates in the B-axis direction.

The substitute tool 22 is disposed on a tip end of the spindle 20. In the present embodiment, an end mill is mounted as the substitute tool 22. The spindle 20 is connected to a motor 23 which rotates the substitute tool 22. The motor 23 is driven, and the substitute tool 22 rotates on a central axis of the spindle 20 as a rotation axis.

The machine tool 10 of the present embodiment includes linear feed axes (the X axis, the Y axis, and the Z axis) and a rotational feed axis (the B axis), operates the column 16, the spindle head 18, and the table 14 in the respective X-axis, Y-axis, and Z-axis directions while rotating the substitute tool 22, and thus can cut the workpiece 1 fixed to the table 14 into a desired shape. Further, the machine tool 10 can drive the rotary table 42 to rotate the workpiece 1 around the B axis. The machine tool 10 of the present embodiment functions as a four-axis machine tool including the B axis.

Figure 2:
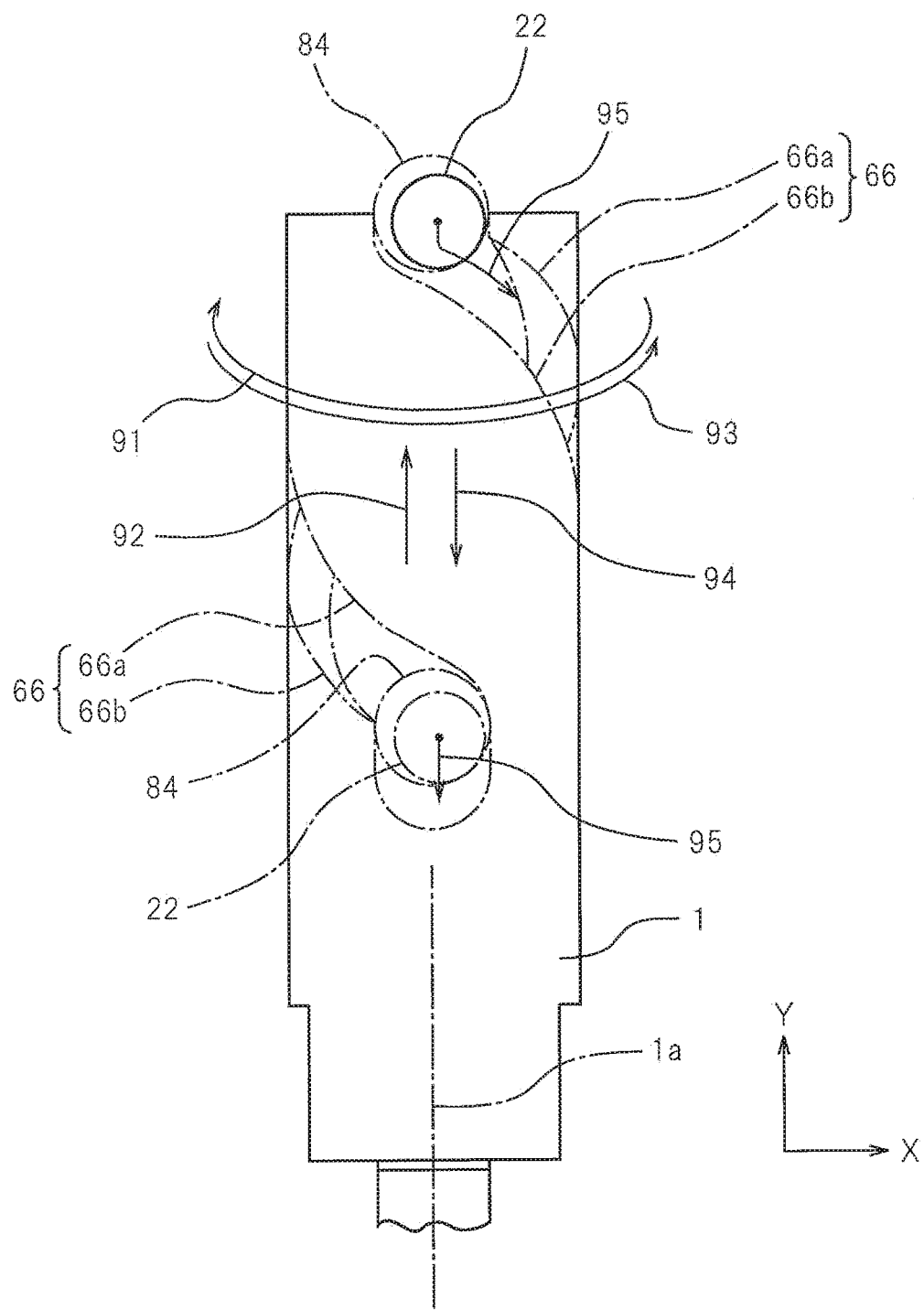
FIG. 2 is a schematic view of a workpiece and a groove portion when grooving is performed using a substitute tool in the first embodiment.

FIG. 2 is a schematic plan view of the workpiece 1 in the present embodiment. In the present embodiment, a groove portion 66 is formed on a circumferential surface of the columnar workpiece 1. The groove portion 66 spirally extends on the surface of the workpiece 1. Grooving for forming the groove portion 66 is performed, and, for example, a cylindrical cam or the like can be manufactured.

With reference to FIG. 1 and FIG. 2, when the groove portion 66 is formed on the workpiece 1, the workpiece 1 is fixed to the rotary table 42 in a manner that a central axis 1*a* of the workpiece 1 becomes parallel to the Y axis. Further, the workpiece 1 is fixed in a manner that the central axis 1*a* coincides with a rotation axis of the rotary table 42. In the machining of the workpiece 1, the workpiece 1 is linearly moved in the X-axis direction and the Y-axis direction and rotated in the B-axis direction.

In a grooving method of the present embodiment, cutting is performed using the substitute tool 22 having a diameter smaller than a groove width of the groove portion 66. The groove portion 66 of the present embodiment has an approximately quadrangular cross section, a side surface 66*a* on one side, and a side surface 66*b* on the other side.

The groove portion 66 of the present embodiment is formed to have constant depth and groove width. When such a groove portion 66 is to be formed, control is performed to change respective positions of the X axis, the Y axis, and the B axis along the surface of the workpiece 1 without changing a relative position (a position of the Z axis) in a depth direction of the substitute tool 22 in cutting.

The grooving method of the present embodiment includes a reciprocation step for reciprocating the substitute tool 22 along a shape of the groove portion 66. On an outward path of the reciprocation step, the side surface 66*a* on one side of the groove portion 66 is machined. As indicated by an arrow 95, the substitute tool 22 is relatively moved to a direction in which the groove portion 66 extends, and the side surface 66*a* on one side of the groove portion 66 is machined. In the machine tool 10 of the present embodiment, the spindle 20 is moved in the Y-axis direction. The workpiece 1 is relatively moved to the substitute tool 22 in the Y-axis direction as indicated by an arrow 92. Further, the workpiece 1 is relatively moved to the substitute tool 22 by rotating the workpiece 1 around the central axis 1*a* as indicated by an arrow 91. When the substitute tool 22 reaches a predetermined end of the groove portion 66, the substitute tool 22 is moved in the X-axis direction and the Y-axis direction to be disposed on a position of a return path. Then, a direction of the relative movement is changed, and machining on the return path is performed.

On the return path of the reciprocation step, the side surface 66*b* on the other side of the groove portion 66 is machined. The substitute tool 22 is relatively moved to the direction in which the groove portion 66 extends, and the groove portion 66 is formed. In the present embodiment, the workpiece 1 is rotated as indicated by an arrow 93 while being relatively moved to the substitute tool 22 as indicated by an arrow 94, so that the relative movement between the workpiece 1 and the substitute tool 22 is performed.

When the substitute tool 22 having a diameter smaller than the groove width of the groove portion 66 performs once the machining on the side surfaces 66*a* and 66*b* of the groove portion 66, the groove portion 66 is hardly to be formed into the desired shape, and incomplete cutting part is generated in any portion in a depth direction of the side surfaces 66*a* and 66*b* of the groove portion 66. The incomplete cutting part is described which is generated when the substitute tool 22 having a diameter smaller than the groove width of the groove portion 66 machines the side surface of the groove portion 66.

Figure 3:
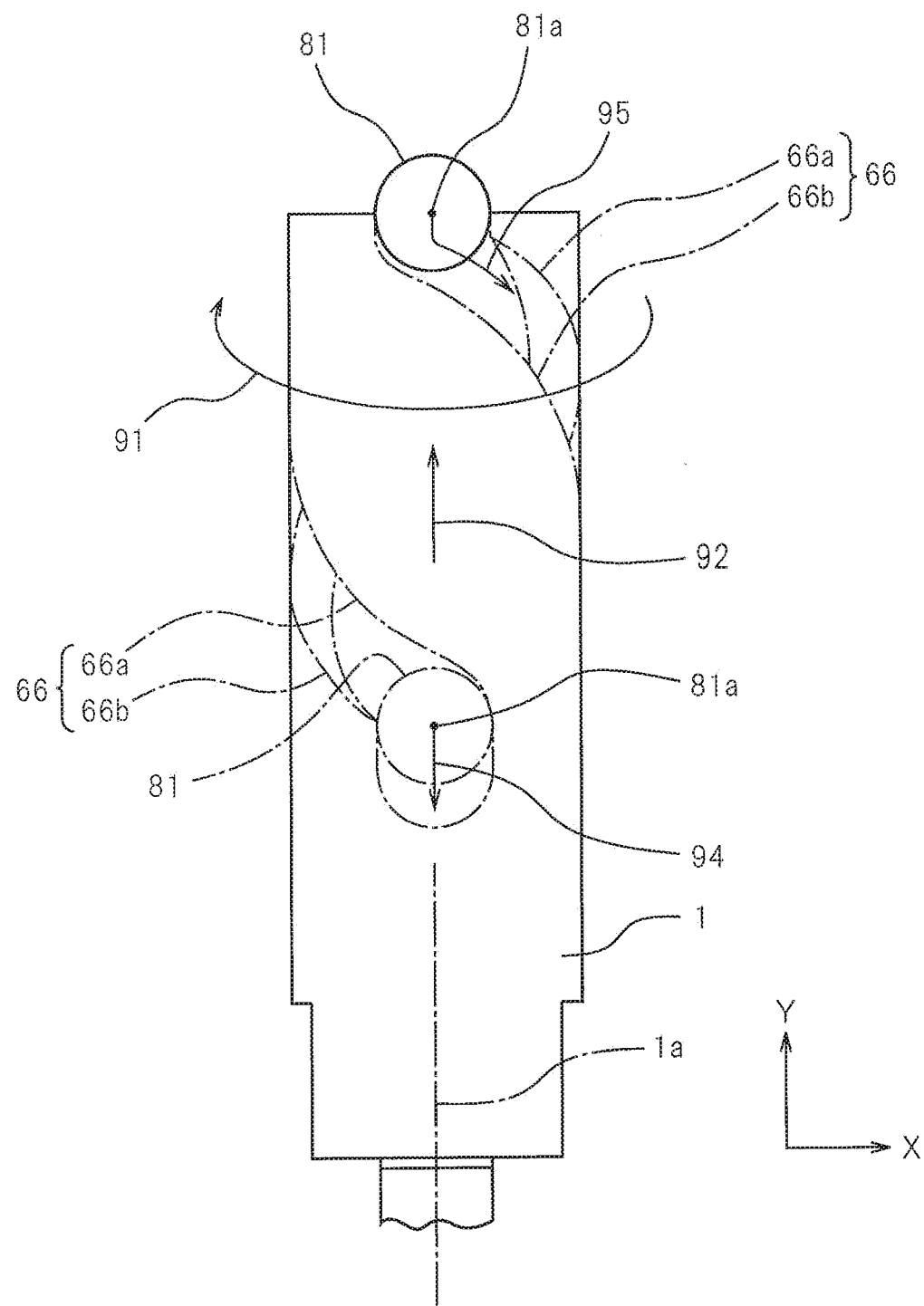
FIG. 3 is a schematic view of a workpiece and a groove portion when grooving is performed using a specified tool in the first embodiment.

FIG. 3 is a schematic plan view of the workpiece 1 when machining is performed using the specified tool. A specified tool 81 has a diameter identical to the groove width of the groove portion 66. The specified tool 81 of the present embodiment is a rotary tool optimum to form the groove portion 66. When the specified tool 81 is used, as indicated by the arrow 95, the groove portion 66 can be formed by relatively moving the specified tool 81 once along the direction in which the groove portion 66 extends. In the machine tool 10 of the present embodiment, the spindle 20 is moved in the Y-axis direction, and the workpiece 1 is rotated around the B axis. The workpiece 1 is relatively moved to the specified tool 81 in the Y-axis direction as indicated by the arrow 92 and rotated around the central axis 1*a* as indicated by the arrow 91, accordingly the groove portion 66 can be formed. When the specified tool 81 is used, the side surface 66*a* on one side and the side surface 66*b* on the other side can be both formed by one-time machining.

Figure 4:
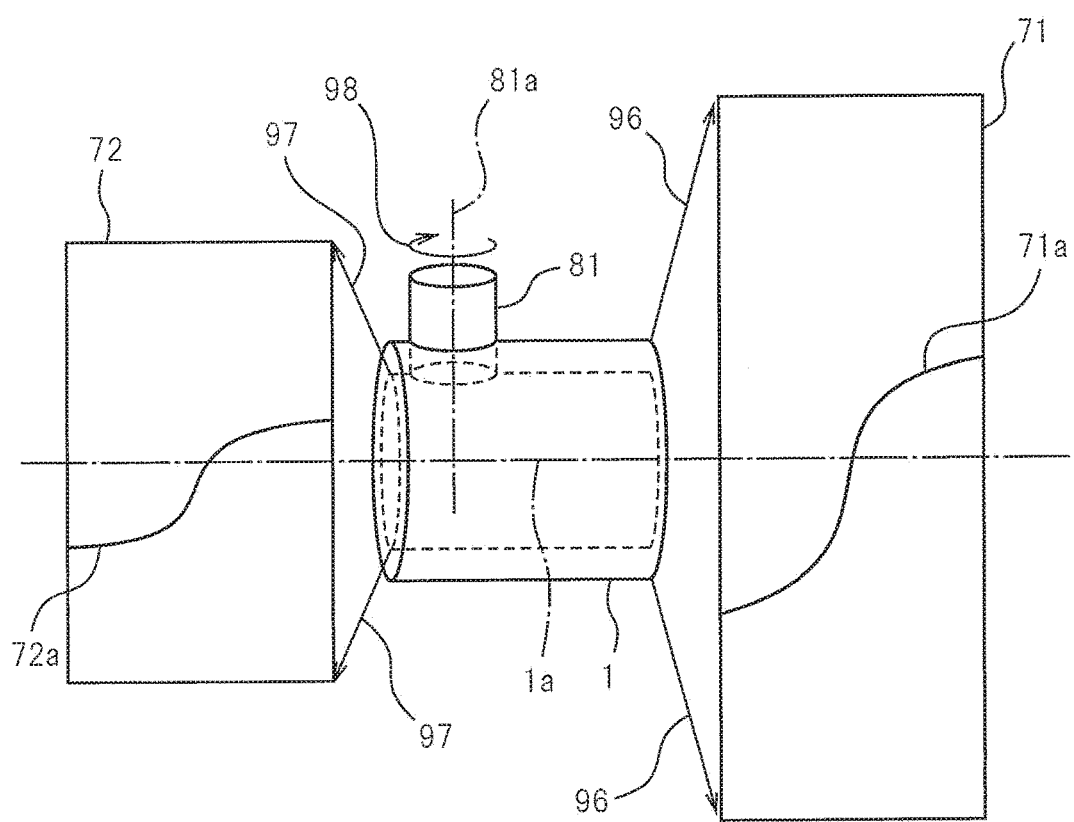
FIG. 4 is a view illustrating a trajectory of a central axis of the specified tool when grooving is performed using the specified tool in the first embodiment.

FIG. 4 is a schematic view illustrating a trajectory of a central axis 81*a* of the specified tool 81 when the specified tool 81 is used. In the example illustrated in FIG. 4, the specified tool 81 is disposed in a manner that the central axis 81*a* of the specified tool 81 becomes parallel to a radial direction of the workpiece 1. In other words, the central axis 1*a* of the workpiece 1 is disposed on the extension of the central axis 81*a*.

The specified tool 81 rotates on the central axis 81*a* as indicated by an arrow 98. One end of the specified tool 81 is inserted into the workpiece 1. A development view 71 is a view that the circumferential surface of the workpiece 1 is developed as indicated by arrows 96. A trajectory 71*a* that the central axis 81*a* passes is depicted on the circumferential surface of the workpiece 1. The specified tool 81 has a point of a tip end on the central axis 81*a*, namely a tool tip point. A development view 72 is a view that a circumferential plane of the workpiece 1 which passes the tool tip point is developed as indicated by arrows 97. A trajectory 72*a* of the tool tip point is depicted in the development view 72.

When comparing the trajectory 71*a* of points on the tool central axis 81*a* on the surface of the workpiece 1 with the trajectory 72*a* of the tool tip points, it is understood that shapes of these trajectories are different from each other. When the workpiece 1 rotates with respect to the specified tool 81, radii of rotation are different from each other, so that the respective trajectories of points are different. Thus, a relative advancing direction of the specified tool 81 to the workpiece 1 is different depending on a depth direction of the groove portion 66.

Figure 5:
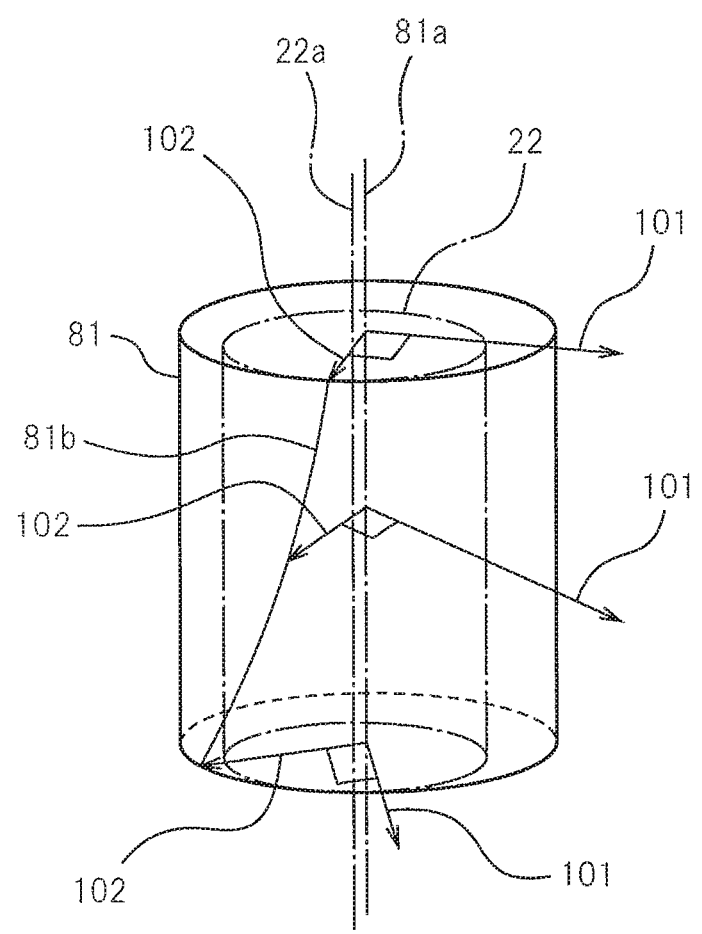
FIG. 5 is a schematic view illustrating a virtual advancing direction and a portion in which a workpiece is machined when grooving is performed using the specified tool in the first embodiment.

FIG. 5 is a schematic view illustrating a direction to which the central axis 81*a* moves when the specified tool 81 is moved with respect to the workpiece 1. An arrow 101 indicates a virtual advancing direction of the specified tool 81 at a predetermined point in the depth direction. The virtual advancing direction is a virtual advancing direction of a tool when it is assumed that the workpiece 1 is stopped and the tool moves. It is understood that the virtual advancing direction varies in a direction to which the central axis 81*a* extends. In other words, it is understood that the virtual advancing direction varies in the depth direction of the groove portion 66.

An arrow 102 indicates a direction perpendicular to a direction of the arrow 101 indicating the virtual advancing direction. An intersection point of the arrow 102 and the surface of the specified tool 81 is a contact portion 81*b*. The contact portion 81*b* is a portion forming the side surfaces 66*a* and 66*b* of the groove portion 66. In addition, the contact portion 81*b* is equivalent to a portion finally generating a machining surface of the workpiece when the workpiece is machined, which is described below. In the present embodiment, a line of the contact portion 81*b* has characteristics of not being parallel to the central axis 81*a* of the specified tool 81. In the example illustrated in FIG. 5, the line of the contact portion 81*b* is curved; however, a contact portion may be linear.

When the substitute tool 22 having a tool diameter smaller than that of the specified tool 81 is used, the substitute tool 22 can be obliquely disposed so that a central axis 22*a* of the substitute tool 22 is parallel to the central axis 81*a* of the specified tool 81. In other words, the substitute tool 22 can be disposed in a manner that the central axis 22*a* is approximately parallel to the central axis 81*a* of the specified tool 81. Further, the substitute tool 22 can be disposed in a state in which a surface of the substitute tool 22 is in contact with a position of the surface of the specified tool 81, when the specified tool 81 is used. In this case, the central axis 22*a* of the substitute tool 22 is on a position shifted from the central axis 81*a* of the specified tool 81. No matter how a position of the central axis 22*a* is selected, it is impossible for the surface of the substitute tool 22 to pass through all of the contact portions 81*b* in one-time machining. Thus, when cutting is performed by disposing the substitute tool 22, incomplete cutting part is generated in some areas in the depth direction of the groove portion 66. The substitute tool 22 has characteristics that if it intends to form the side surface 66*a* or the side surface 66*b* of the groove portion 66 in one-time machining using the substitute tool 22, a desired side surface shape is not gained.

In the grooving method of the present embodiment, machining is performed for a plurality of times by changing a relative position of the substitute tool 22 to the workpiece 1 in order to form a side surface of the groove portion 66.

Figure 6:
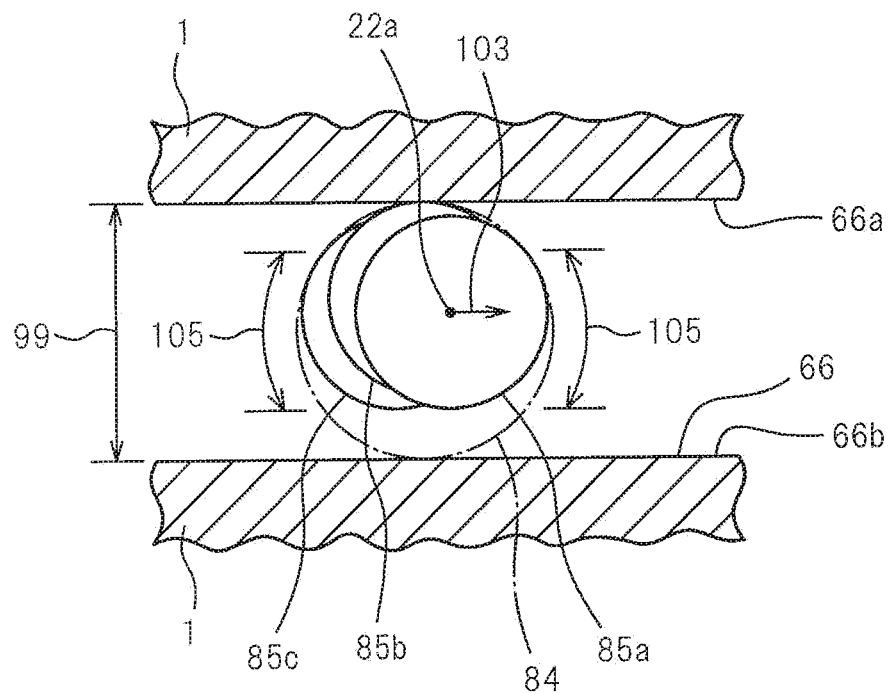
FIG. 6 is a schematic cross-sectional view illustrating when grooving is performed using the substitute tool in the first embodiment.

FIG. 6 is a schematic cross-sectional view illustrating the grooving method of the present embodiment. In the grooving method of the present embodiment, the substitute tool 22 is used of which diameter is smaller than the groove width of the groove portion 66 indicated by an arrow 99. In other words, the substitute tool 22 is used in place of the specified tool 81. FIG. 6 illustrates machining of the side surface 66*a* on one side of the groove portion 66 as an example.

In the grooving method of the present embodiment, a tilt of the substitute tool 22 is set so that the central axis 22*a* of the substitute tool 22 is parallel to the depth direction of the groove portion 66. In other words, the tilt of the substitute tool 22 is set so that a central axis of a circle 84 for disposing the substitute tool 22 is parallel to a rotation axis of the substitute tool 22.

In the grooving method of the present embodiment, the machining is performed for a plurality of times by gradually changing a position of the substitute tool 22 to the side surface 66*a* on one side of the groove portion 66. In other words, the side surface 66*a* on one side is formed by gradually changing a path of the substitute tool 22. In the example illustrated in FIG. 6, the substitute tool 22 is disposed on a position 85*a* in the machining of a first time. Then, as indicated by an arrow 103, the substitute tool 22 is relatively moved along the direction in which the groove portion 66 extends. In the machining of the side surface 66*a* of a second time, the substitute tool 22 is disposed on a position 85*b* and is relatively moved along the direction in which the groove portion 66 extends. Further, in the machining of the side surface 66*a* of a third time, the substitute tool 22 is disposed on a position 85*c* and is relatively moved along the direction in which the groove portion 66 extends. Each of the positions 85*a*, 85*b*, and 85*c* is set to be inscribed to the circle 84 of which diameter is the groove width of the groove portion 66. In other words, the substitute tool 22 is disposed so that the surface of the substitute tool 22 is in contact with a position of the surface of the specified tool 81 when the specified tool 81 is used.

In the machining on a return path, similar to the machining on the outward path, the machining is performed for a plurality of times by changing the position of the substitute tool 22 to form the side surface 66*b* on the other side of the groove portion 66. In the present embodiment, the machining is performed for three times by changing the position of the substitute tool 22 on the outward path and the return path. An arbitrary number of times can be selected as the number of machining times for forming a side surface. When the number of machining times increases, a scallop height can be reduced as described below. In other words, machining accuracy of a groove portion can be improved.

Figure 7:
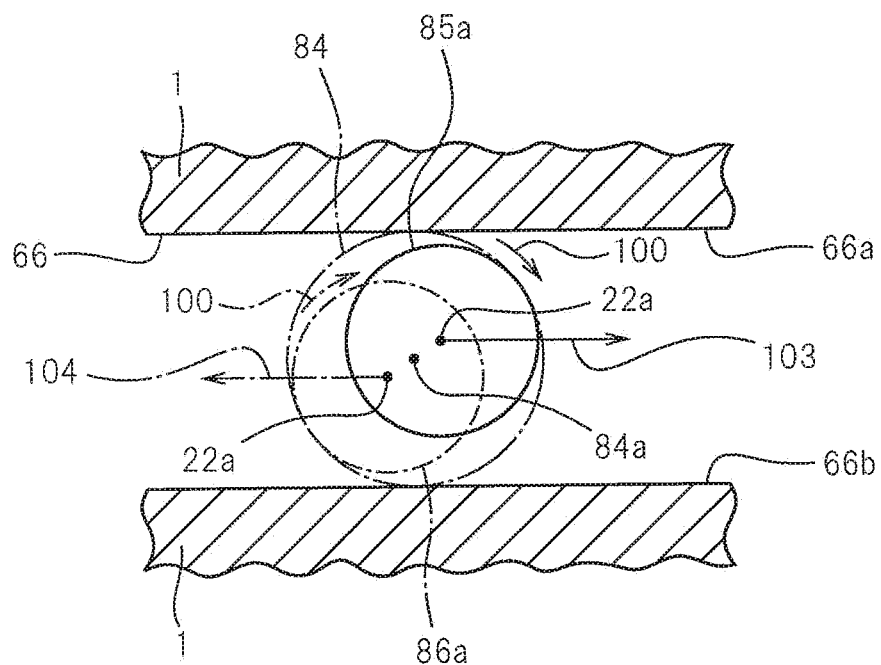
FIG. 7 is a schematic view illustrating machining on an outward path and a return path of a first time in a grooving method of the first embodiment.

FIG. 7 is a schematic cross-sectional view illustrating positions of the substitute tool 22 on the outward path and on the return path in the machining of the first time. An arrow 100 indicates a rotating direction of the substitute tool 22, and the same rotation direction is used on both of the outward path and the return path. In the machining on the outward path of the first time, the substitute tool 22 is disposed on the position 85*a*. The substitute tool 22 is moved along an extending shape of the groove portion 66 as indicated by the arrow 103, and the machining is performed on the side surface 66*a* on one side. In the machining on the return path of the first time, the substitute tool 22 is disposed on a position 86*a*. The substitute tool 22 is moved along the extending shape of the groove portion 66 as indicated by an arrow 104, and the machining is performed on the side surface 66*b* on the other side.

Figure 8:
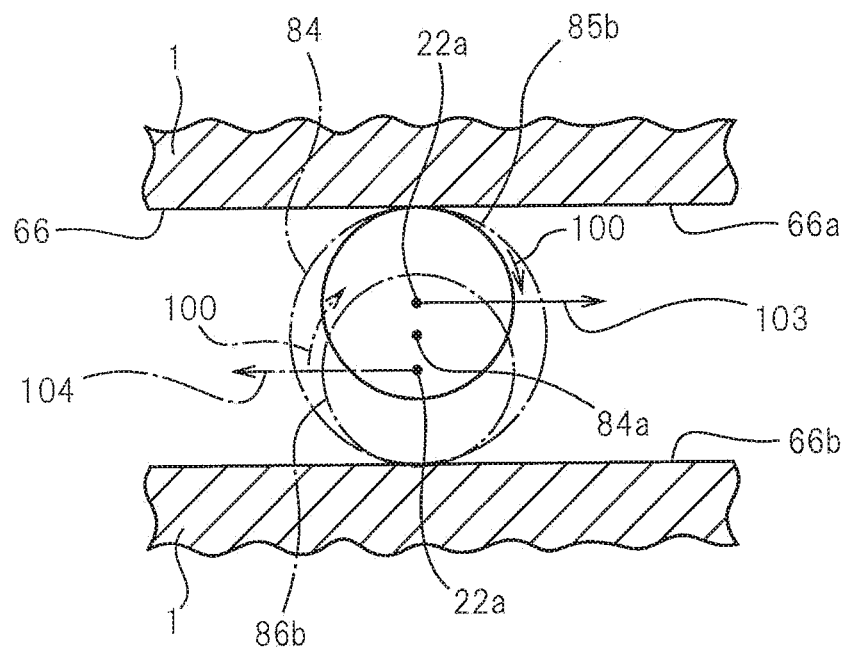
FIG. 8 is a schematic view illustrating machining on an outward path and a return path of a second time in the grooving method of the first embodiment.

FIG. 8 is a schematic cross-sectional view illustrating positions of the substitute tool 22 on the outward path and on the return path in the machining of the second time. In the machining of the second time, the substitute tool 22 is disposed on the position 85*b* on the outward path and moved in a direction indicated by the arrow 103, so that the side surface 66*a* on one side is machined. On the return path, the substitute tool 22 is disposed on a position 86*b* and moved in a direction indicated by the arrow 104, so that the side surface 66*b* on the other side is machined.

Figure 9:
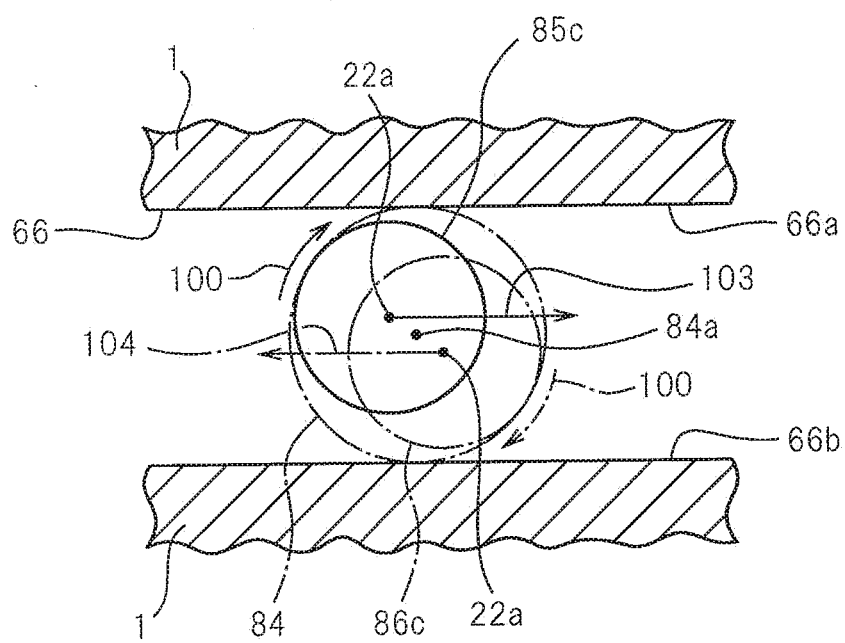
FIG. 9 is a schematic view illustrating machining on an outward path and a return path of a third time in the grooving method of the first embodiment.

FIG. 9 is a schematic cross-sectional view illustrating positions of the substitute tool 22 on the outward path and on the return path in the machining of the third time. In the machining of the third time, the substitute tool 22 is also disposed on the position 85*c* on the outward path, and the machining is performed on the side surface 66*a* on one side similar to the machining of the first time and the second time. On the return path, the substitute tool 22 is disposed on a position 86*c*, and the machining is performed on the side surface 66*b* on the other side.

In the grooving method of the present embodiment, the positions 85*a*, 85*b*, and 85*c* of the substitute tool 22 on the outward path and the positions 86*a*, 86*b*, and 86*c* of the substitute tool 22 on the return path are respectively in symmetrical positions. For example, in the machining of the first time, the position 85*a* on the outward path and the position 86*a* on the return path are in positions symmetrical to a center point 84a of the circle 84. In other words, the tool tip point of the position 85a and the tool tip point of the position 86a are set to positions symmetrical to each other with respect to the center point 84a of the circle 84.

Figure 10:
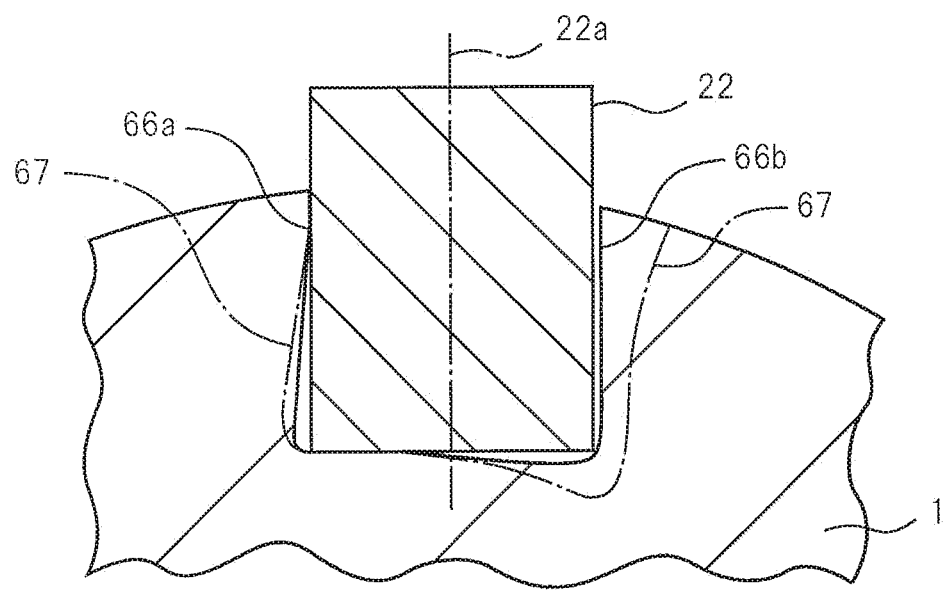
FIG. 10 is a schematic cross-sectional view illustrating machining on the outward path of the first time in the grooving method of the first embodiment.
Figure 11:
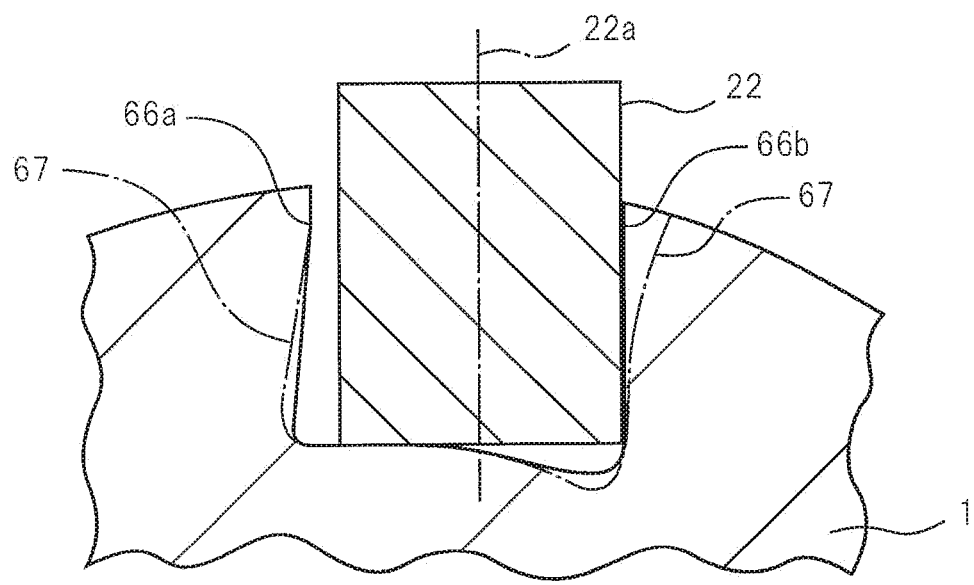
FIG. 11 is a schematic cross-sectional view illustrating machining on the return path of the first time in the grooving method of the first embodiment.

FIG. 10 is a schematic cross-sectional view illustrating when the side surface 66a on one side is machined on the outward path in the machining of the first time. FIG. 11 is a schematic cross-sectional view illustrating when the side surface 66b on the other side is machined on the return path in the machining of the first time. Each drawing illustrates a machining surface 67 having a shape desired by a user. The machining is performed for a plurality of times so as to match the side surfaces 66a and 66b of the groove portion 66 with the machining surface 67.

On the outward path in the machining of the first time, an upper portion of the side surface 66a on one side can be cut so as to be almost identical to the machining surface 67. However, at a central portion and a lower portion of the side surface 66a on one side, it is difficult to perform the machining up to the machining surface 67, and incomplete cutting part is generated. On the return path of the machining of the first time, the lower portion of the side surface 66b on the other side can be cut up to the machining surface 67. However, at a central portion and an upper portion of the side surface 66b on the other side, it is difficult to perform the machining up to the machining surface 67, and incomplete cutting part is generated.

Figure 12:
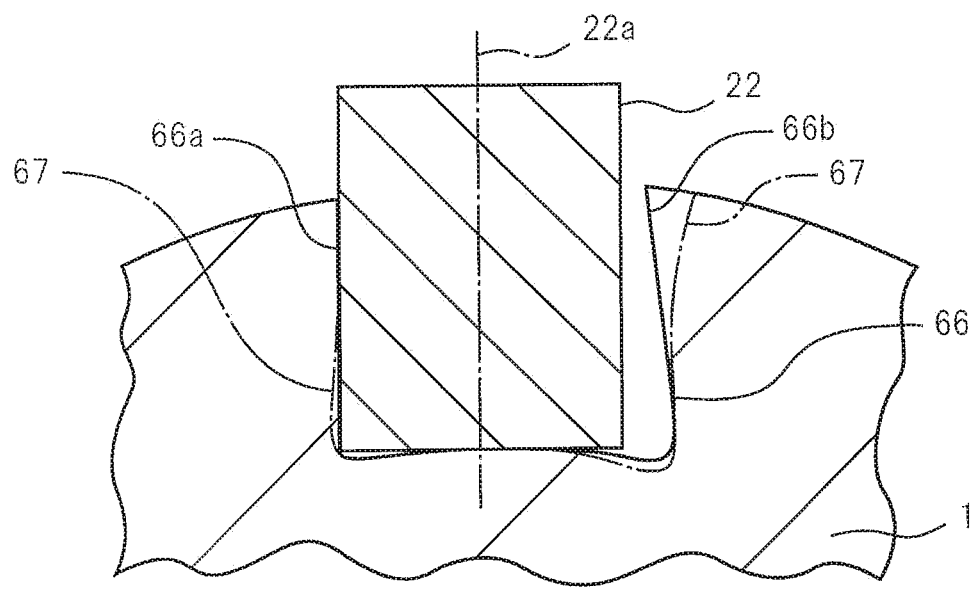
FIG. 12 is a schematic cross-sectional view illustrating machining on the outward path of the second time in the grooving method of the first embodiment.
Figure 13:
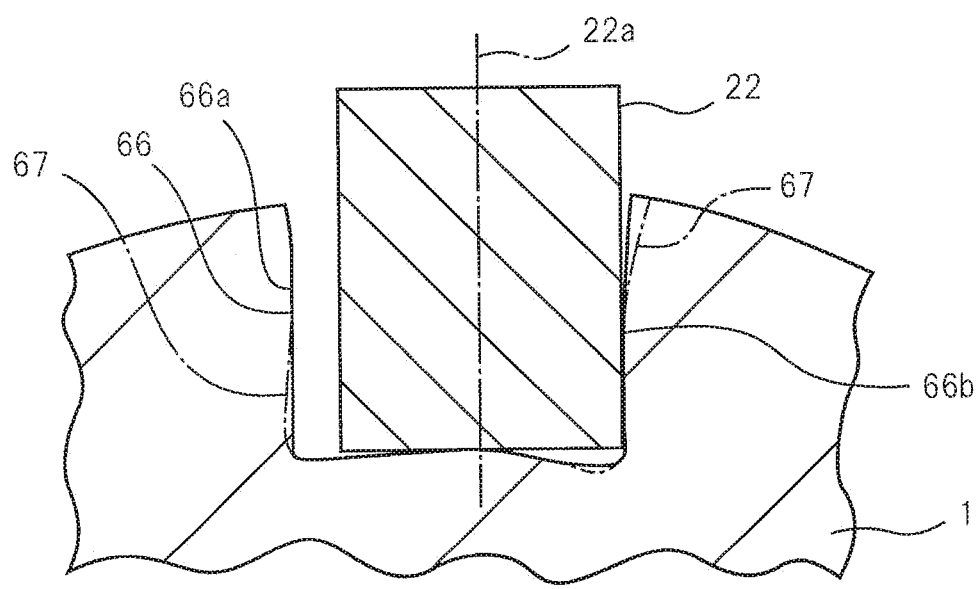
FIG. 13 is a schematic cross-sectional view illustrating machining on the return path of the second time in the grooving method of the first embodiment.

FIG. 12 is a schematic cross-sectional view illustrating when the machining of the second time is performed on the outward path. FIG. 13 is a schematic cross-sectional view illustrating when the machining of the second time is performed on the return path. On the outward path in the machining of the second time, the machining can be performed so as to bring the central portion of the side surface 66a on one side close to the machining surface 67. On the return path in the machining of the second time, the machining can be performed so as to bring the central portion of the side surface 66b on the other side close to the machining surface 67.

Figure 14:
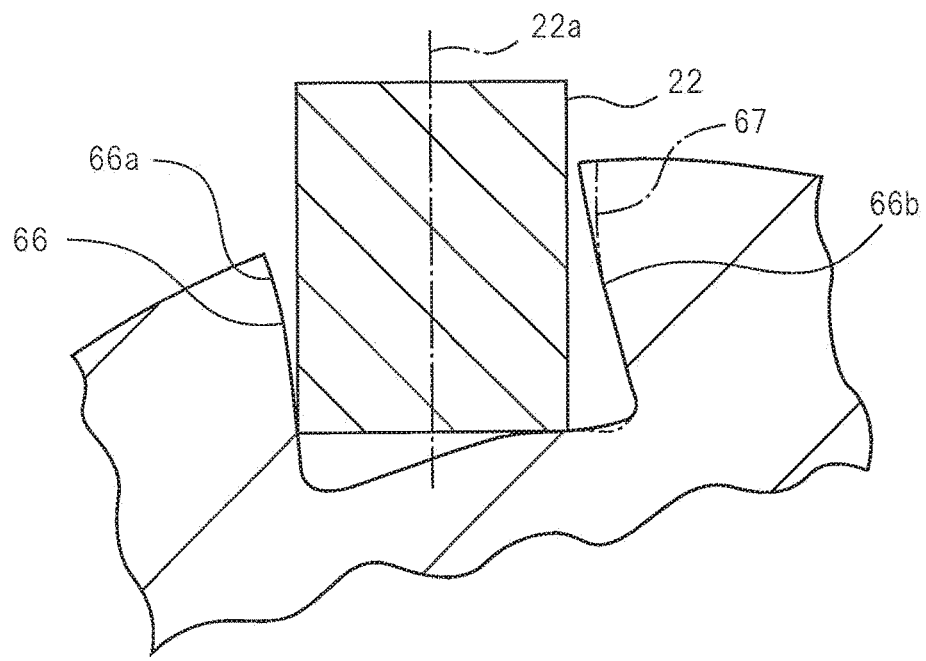
FIG. 14 is a schematic cross-sectional view illustrating machining on the outward path of the third time in the grooving method of the first embodiment.
Figure 15:
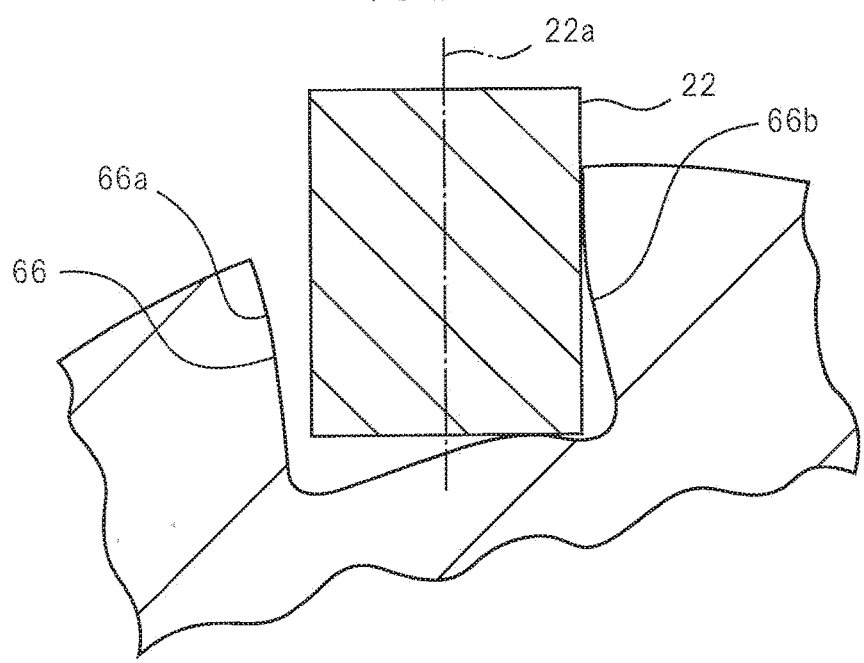
FIG. 15 is a schematic cross-sectional view illustrating machining on the return path of the third time in the grooving method of the first embodiment.

FIG. 14 is a schematic cross-sectional view illustrating when the machining of the third time is performed on the outward path. FIG. 15 is a schematic cross-sectional view illustrating when the machining of the third time is performed on the return path. On the outward path and the return path of the machining of the third time, the incomplete cutting part on the side surface 66a on one side and the side surface 66b on the other side can be cut. Accordingly, the groove portion 66 can match the machining surface 67 having the desired shape.

As described above, the grooving method of the present embodiment includes a machining step for machining the workpiece 1 by relatively moving the substitute tool 22 in the tool path along the direction in which the groove portion 66 extends. In the machining step, the substitute tool 22 is disposed so as to be inscribed to the circle 84 of which diameter is the groove width of the groove portion 66 to be formed on the workpiece 1. The machining is performed for a plurality of times by changing the relative position of the substitute tool 22 to the workpiece 1. Adopting the method makes it possible to form a groove portion of which groove width is greater than a diameter of a rotary tool in a short time. Further, machining of a groove portion can be performed with high accuracy without using a rotary tool having a diameter identical to a groove width. Furthermore, there is no need to change a tool when a groove width of a groove portion to be generated is changed, and the groove portion can be formed by a rotary tool having a diameter smaller than the groove width.

As a comparative example, when a groove portion having a large groove width is formed, a dedicated tool head (an eccentric holder) can be used which causes a rotary tool to make a planetary rotary motion. However, the dedicated tool head performing the planetary rotary motion has low rigidity, and therefore it is impossible to increase a cutting amount. Therefore, it is preferable to set a feed rate of the tool head to a small value. Therefore, there is a problem that when the tool head performing the planetary rotary motion is used, a machining time becomes longer. In contrast, the grooving method of the present embodiment can increase a cutting amount of a workpiece, and grooving can be performed in a short time.

When the rotary tool makes the planetary rotary motion, there are many areas in which the rotary tool is not in contact with the workpiece, and machining takes a long time. In contrast, the grooving method of the present embodiment can set a path of the rotary tool in an area necessary for forming the groove portion 66, and grooving can be performed in a short time.

For example, as illustrated in FIG. 6, a range inscribed to the circle 84 of which diameter is the groove width of the groove portion 66 includes a range in which the side surface of the groove portion 66 is machined and a range in which the side surface of the groove portion 66 is not machined. In ranges close to the side surfaces of the groove portion, the side surfaces of the groove portion 66 are machined, however, ranges other than that, namely areas indicated by arrows 105 do not contribute to machining of the side surfaces of the groove portion 66. Thus, the machining time can be shortened by disposing the substitute tool 22 avoiding the areas indicated by the arrows 105. In the present embodiment, a range in which the substitute tool 22 is disposed to form the groove portion 66 is calculated, which is described below. Therefore, the grooving can be performed in a short period of time.

Next, the control device of the machine tool and the tool path generation device are described which perform the grooving method of the present embodiment.

Figure 16:
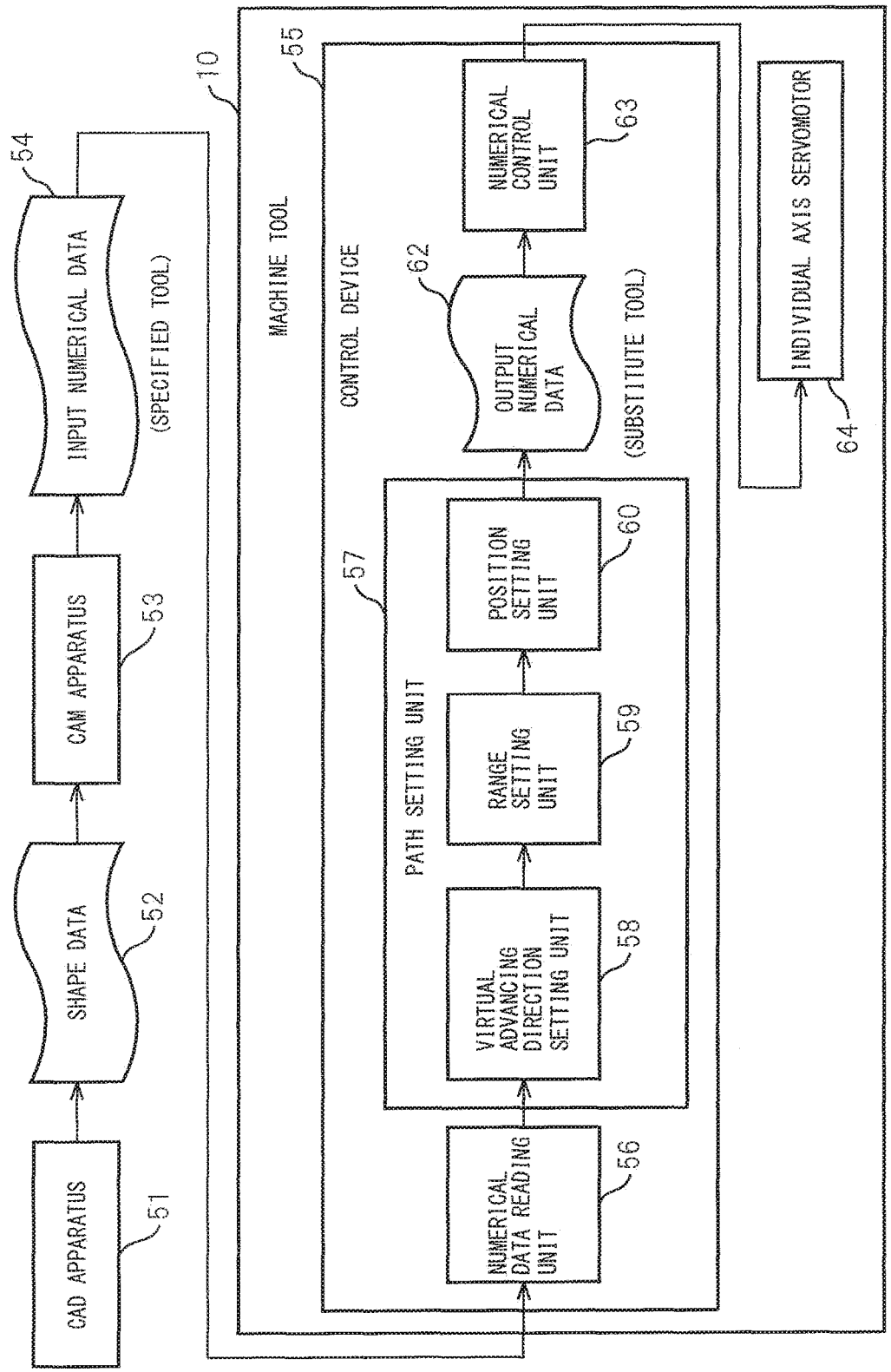
FIG. 16 is a schematic view of a machining system which machines a workpiece in the first embodiment.

FIG. 16 is a schematic view of a machining system which includes the machine tool 10 and a device for generating input numerical data 54 which is input to the machine tool 10 according to the present embodiment. In the present embodiment, a CAD (Computer Aided Design) apparatus 51 designs a shape of the workpiece 1. The CAD apparatus 51 supplies shape data 52 of the workpiece 1 to a CAM (Computer Aided Manufacturing) apparatus 53. The shape data 52 includes shape data of the groove portion 66 to be formed on the workpiece 1. A user can input information of the specified tool 81 to the CAM apparatus 53. In the present embodiment, the information of the specified tool 81 having a diameter identical to the groove width of the groove portion 66 is input. The specified tool 81 may be automatically specified by the CAM apparatus 53.

In the CAM apparatus 53, the input numerical data 54 is generated based on the shape data 52 as input information to be input to the control device 55 of the machine tool 10. The input numerical data 54 of the present embodiment is numerical data for forming a groove portion using the specified tool 81 having the diameter identical to the groove width of the groove portion 66.

The numerical control type machine tool 10 of the present embodiment includes the control device 55. The control device 55 of the present embodiment includes an arithmetic processing device. The arithmetic processing device includes a microprocessor (CPU) performing arithmetic processing and the like, a ROM (Read Only Memory) and a RAM (Random Access Memory) as storage devices, and other peripheral circuits.

The control device 55 generates output numerical data 62 using the input numerical data 54. The output numerical data 62 includes an instruction issued to a machine when the substitute tool 22 having a tool diameter smaller than that of the specified tool 81 is used. The output numerical data 62 includes information of tool paths on which machining is performed for a plurality of times to form the groove portion 66. In the present embodiment, the output numerical data 62 includes numerical data for relatively moving the substitute tool 22 to the workpiece 1.

The control device 55 of the present embodiment includes a numerical data reading unit 56 serving as an input information reading unit and a path setting unit 57. The numerical data reading unit 56 has a function of reading the input numerical data 54. The path setting unit 57 generates the output numerical data 62 based on the read input numerical data 54. The path setting unit 57 of the present embodiment includes a virtual advancing direction setting unit 58, a range setting unit 59, and a position setting unit 60. The output numerical data 62 is input to a numerical control unit 63. The numerical control unit 63 drives an individual axis servomotor 64 based on the output numerical data 62. The individual axis servomotor 64 includes the X-axis servomotor 38, the Y-axis servomotor 31, the Z-axis servomotor 25, and the B-axis servomotor 43.

Figure 17:
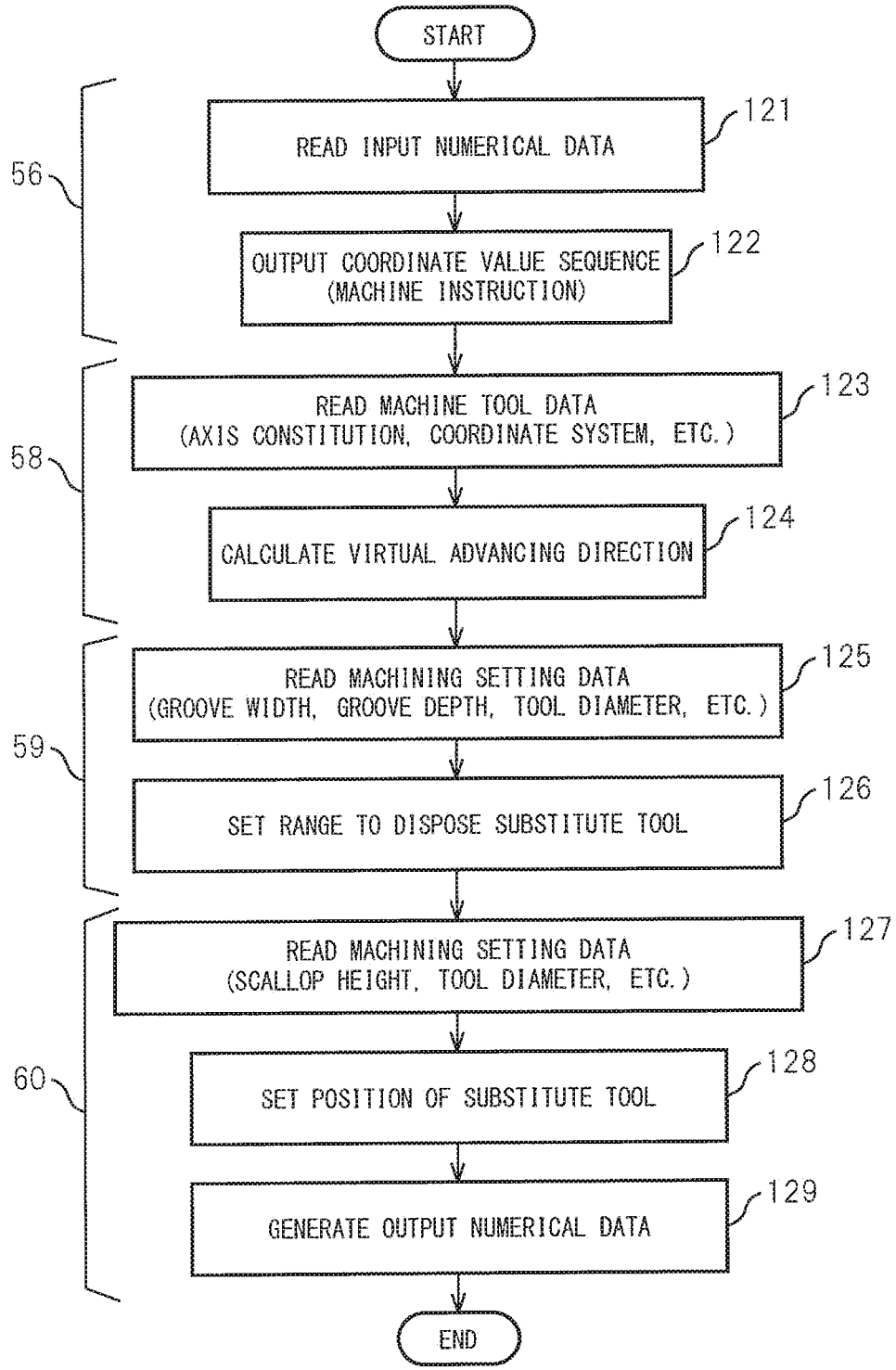
FIG. 17 is a flowchart illustrating control by a control device of the machine tool in the first embodiment.

FIG. 17 is a flowchart illustrating control by the control device of the machine tool of the present embodiment. With reference to FIG. 16 and FIG. 17, the input numerical data 54 generated by the CAM apparatus 53 is input to the numerical data reading unit 56 of the control device 55. The input numerical data 54 of the present embodiment includes data indicating a path of the tool tip point when the specified tool 81 is used. The input numerical data 54 includes, for example, coordinate values of the XYZ axes and rotational angles of ABC axes. The input information to be input to the control device 55 is not limited to the above-described numerical data pieces, and input information indicating a path of an arbitrary portion of the specified tool can be adopted.

First, in step 121, the control device 55 reads the input numerical data 54 by the numerical data reading unit 56. In step 122, a coordinate value sequence is output. The coordinate value sequence of the control includes the coordinate values of the XYZ axes and the rotational angles of the ABC axes.

Next, the path setting unit 57 sets a tool path on which machining is performed using the substitute tool 22 having a diameter smaller than that of the specified tool 81. In step 123, the virtual advancing direction setting unit 58 of the path setting unit 57 reads data of the machine tool 10. The data of the machine tool 10 includes an axis constitution and a coordinate system of the machine tool 10 and so on. Next, in step 124, the virtual advancing direction setting unit 58 calculates the virtual advancing direction.

Figure 18:
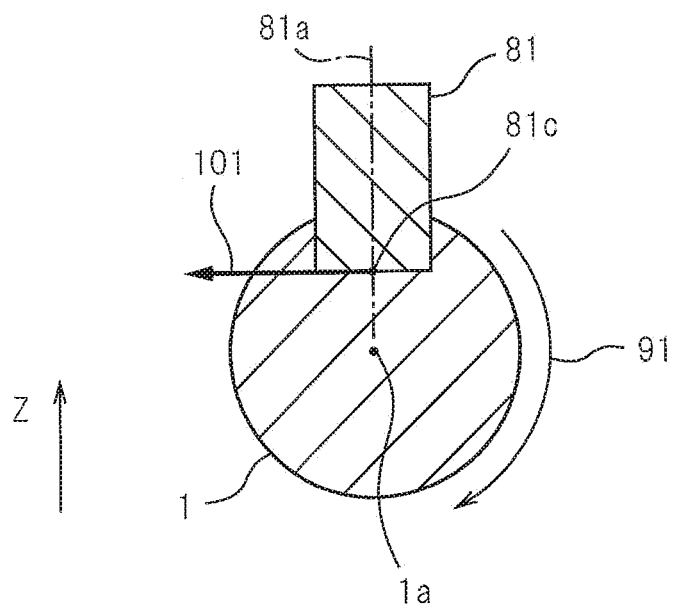
FIG. 18 is a schematic cross-sectional view illustrating a virtual advancing direction of the specified tool.

FIG. 18 is a schematic cross-sectional view illustrating the virtual advancing direction. The virtual advancing direction is an advancing direction of the specified tool 81 with respect to the workpiece 1 when it is assumed that the workpiece 1 is stopped. For the virtual advancing direction, directions that a plurality of points advances on each height of the specified tool 81 can be adopted. In the example illustrated in FIG. 18, the workpiece 1 is rotated in a direction indicated by the arrow 91 without changing the position of the specified tool 81. In other words, the central axis 81a of the specified tool 81 is in a stopped state, and the workpiece 1 is rotated. If it is assumed that the workpiece 1 is stopped in this state, the virtual advancing direction of a tool tip point 81c of the specified tool 81 is a direction indicated by the arrow 101. The virtual advancing direction can be set by, for example, a vector of a unit length on the XYZ axes.

Figure 19:
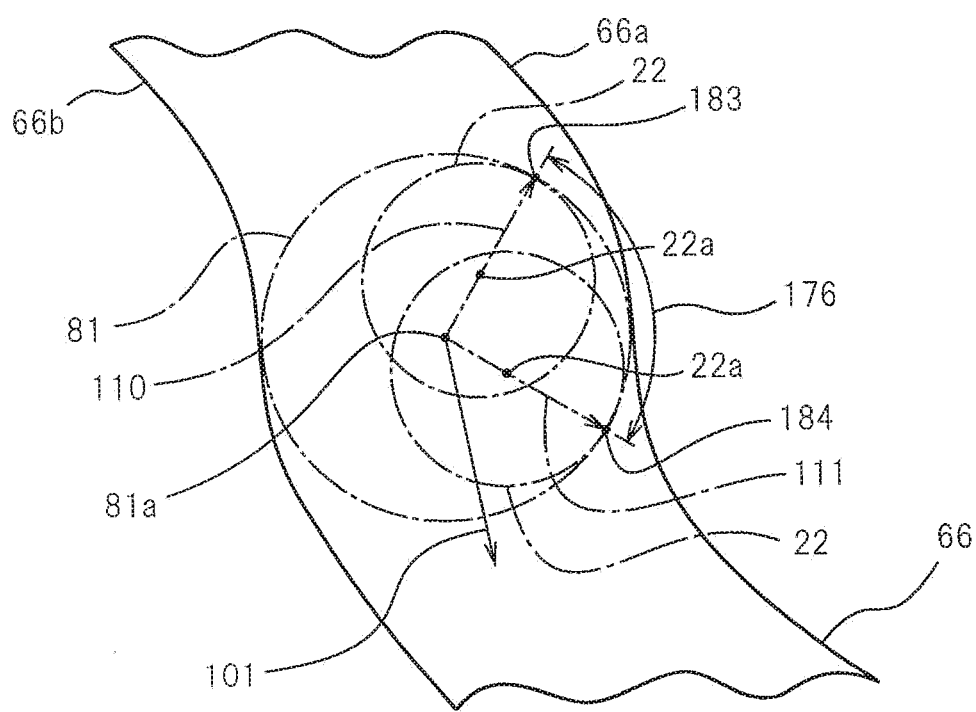
FIG. 19 is a schematic view illustrating the virtual advancing direction of the specified tool and a range in which the substitute tool is disposed in the first embodiment.

FIG. 19 is a schematic plan view illustrating when the grooving is performed according to the present embodiment. The virtual advancing direction of a point on a predetermined height of the specified tool 81 is indicated by the arrow 101. Thus, the virtual advancing direction indicates a direction when the specified tool 81 having the diameter identical to a diameter of the circle 84 advances along the direction in which the groove portion 66 extends.

With reference to FIG. 16 and FIG. 17, up to step 124, the virtual advancing direction is calculated on the assumption that the specified tool 81 is used. Next, a tool path of the substitute tool 22 is set based on the virtual advancing direction of the specified tool 81. The range setting unit 59 of the control device 55 sets a range in which the substitute tool 22 is disposed.

In step 125, the range setting unit 59 reads machining setting data. The machining setting data includes the groove width and depth of the groove portion 66, the tool diameter of the substitute tool 22, and the like. In step 126, the range in which the substitute tool 22 is disposed is set using the machining setting data and the virtual advancing direction.

In the present embodiment, a portion which finally generates a machining surface is calculated based on the virtual advancing direction. The range in which the substitute tool is disposed is set based on the portion which finally generates the machining surface. The portion which finally generates the machining surface in the present embodiment is described below.

Figure 20:
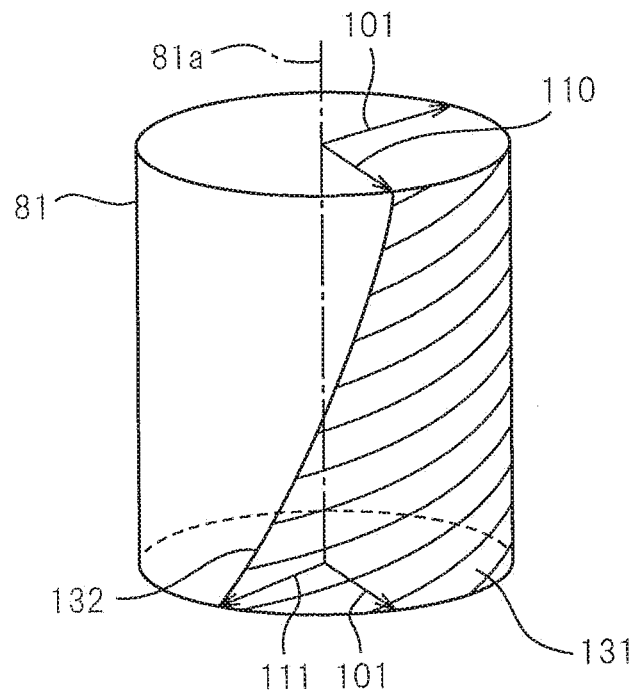
FIG. 20 is a schematic perspective view illustrating a machining area of the specified tool and a portion which finally generates a machining surface in the first embodiment.

FIG. 20 is a schematic perspective view of the specified tool according to the present embodiment. FIG. 20 illustrates a portion of the specified tool 81 where actually performs machining. For example, an upper end of the specified tool 81 illustrated in FIG. 20 is equivalent to an upper end of a groove portion. As described above, in the present embodiment, the virtual advancing direction gradually changes depending on a position in a height direction of the central axis 81a of the specified tool 81.

An intersection point of a direction of a point on the central axis 81a perpendicular to the virtual advancing direction and the surface of the specified tool 81 is a point on which the specified tool 81 is finally in contact with the workpiece 1 when machining the workpiece 1. When the points are connected, the portion of the specified tool 81 which finally generates the machining surface is obtained. The portion which finally generates the machining surface in the present embodiment is indicated by a line 132.

As illustrated in FIG. 5, the virtual advancing direction changes in an axial direction of the specified tool 81, and thus the line 132 which finally generates the machining surface of the present embodiment is not approximately parallel to the central axis 81a of the specified tool 81 but twisted with respect to the central axis 81a. Further, the line 132 is curved.

When the specified tool 81 moves to the virtual advancing direction indicated by the arrow 101, cutting of the workpiece can be performed on a partial area on the surface of the specified tool 81. A machining area 131 in which workpiece is actually machined is set on a side to which the virtual advancing direction advances than the line 132. The specified tool 81 includes the machining area 131 for forming a machining surface of the workpiece. In the machining area 131, the groove portion 66 can be formed by cutting the workpiece 1. An end of the machining area 131 is the portion which finally generates the machining surface. In the present embodiment, the portion which finally generates the machining surface is configured by a line; however, the portion which finally generates the machining surface is not limited to the above-described embodiment and may be a plane or dots.

The line 132 which finally generates the machining surface can be set by calculation. As indicated by arrows 110 and 111, a line perpendicular to the calculated virtual advancing direction is set. Points 183 and 184 are calculated which are intersection points of the line and the surface of the specified tool 81. Similarly, a point on the surface of the specified tool 81 is calculated regarding each of a plurality of points on the central axis 81a, so that the line 132 which finally generates the machining surface can be calculated.

Next, the range in which the substitute tool 22 is disposed is set based on the calculated line 132 which finally generates the machining surface.

Figure 21:
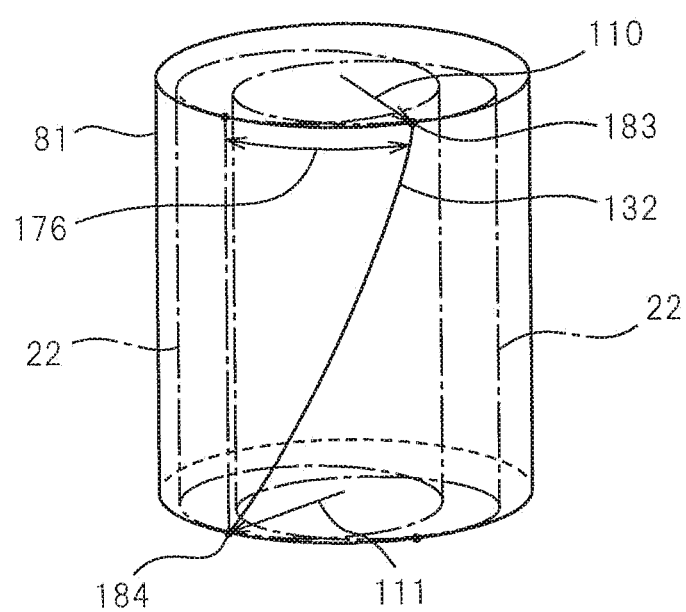
FIG. 21 is a schematic perspective view of the specified tool and the substitute tool illustrating a position on which the substitute tool is disposed in the first embodiment.

FIG. 21 is a schematic perspective view illustrating the range in which the substitute tool is disposed. With reference to FIG. 19 and FIG. 21, the substitute tool 22 is disposed in a manner that the surface of the substitute tool 22 is in contact with the surface of the specified tool 81 when the specified tool 81 is used. The substitute tool 22 is disposed to correspond to the line 132 of the specified tool 81 which finally generates the machining surface. An area between the point 183 of an upper end and the point 184 of a lower end of the line 132 which finally generates the machining surface can be set as the range in which the substitute tool 22 is disposed. In FIG. 19, the range in which the substitute tool 22 is disposed is indicated by an arrow 176.

With reference to FIG. 16 and FIG. 17, the position setting unit 60 sets a position on which the substitute tool 22 is disposed within the range in which the substitute tool 22 is disposed. In step 127, the position setting unit 60 reads the machining setting data. The machining setting data read here includes a scallop height, the tool diameter of the substitute tool, and the like.

Figure 22:
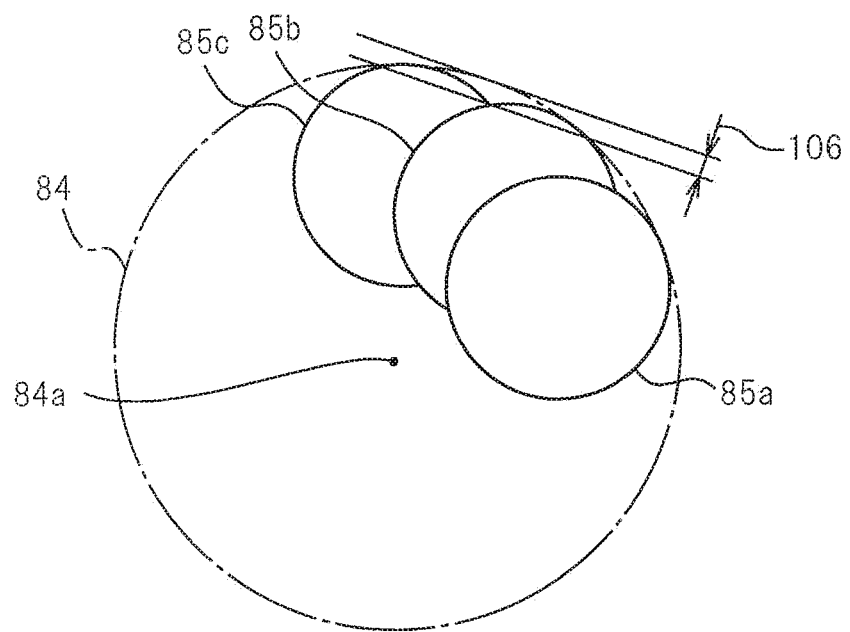
FIG. 22 is a schematic view illustrating a scallop height when a workpiece is machined in the first embodiment.

FIG. 22 is a schematic view illustrating the scallop height according to the present embodiment. In the present embodiment, the positions 85a, 85b, and 85c of the substitute tool 22 are set so as to be inscribed to the circle 84. Thus, the scallop height indicated by an arrow 106 is determined according to the number of the positions on which the substitute tool 22 is disposed. The scallop height also depends on the diameter of the substitute tool 22. For example, the number of positions on which the substitute tool 22 is disposed is increased within the range in which the substitute tool 22 is disposed. In addition, an interval between positions on which the substitute tool 22 is disposed is decreased, so that the scallop height can be lessened. In other words, when the number of times to machine the side surface of the groove portion is increased, the scallop height can be lessened.

With reference to FIG. 16 and FIG. 17, in step 128, the position of the substitute tool 22 can be set based on the input machining setting data, such as the scallop height. In the present embodiment, the number of positions on which the substitute tool is disposed can be calculated based on the scallop height. Thus, when an allowable value of the scallop height is specified, a plurality of positions of the substitute tool 22 can be set within the range in which the substitute tool 22 is disposed. In the present embodiment, the machining is performed three times. The position of the substitute tool 22 can be expressed by, for example, coordinate values of the XYZ axes. Alternatively, for example, a difference from the coordinate value sequence output in step 122 can be output.

Figure 23:
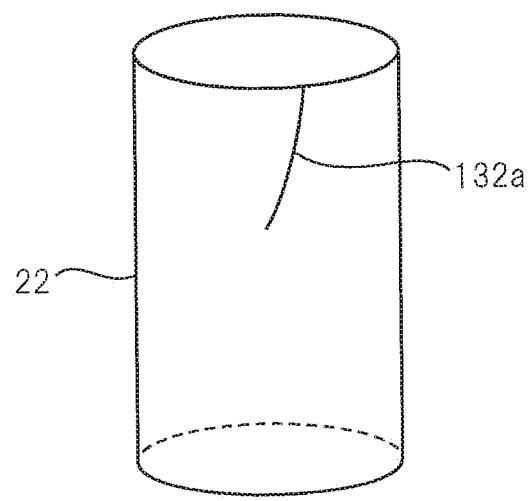
FIG. 23 is a first schematic perspective view of the substitute tool in which a portion which finally generates a machining surface is indicated in the first embodiment.
Figure 24:
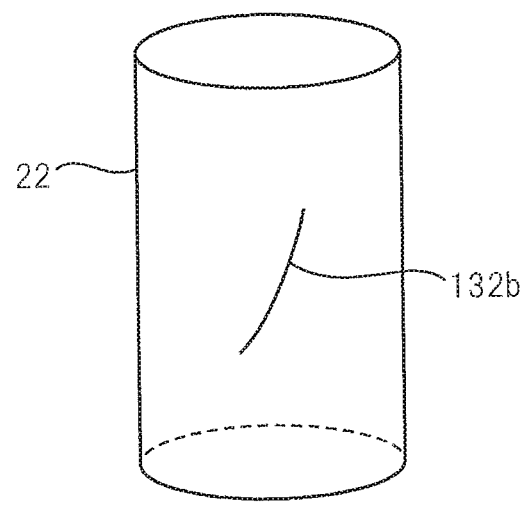
FIG. 24 is a second schematic perspective view of the substitute tool in which a portion which finally generates a machining surface is indicated in the first embodiment.
Figure 25:
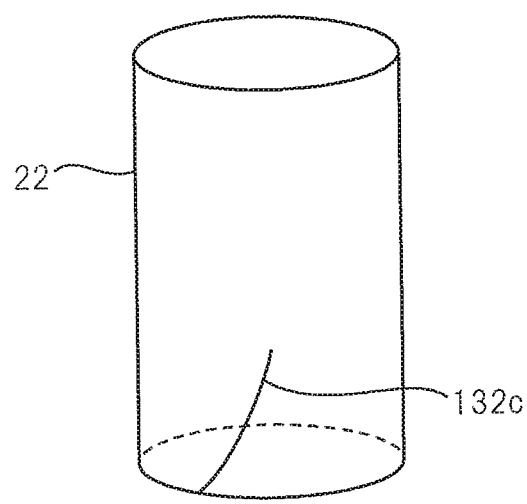
FIG. 25 is a third schematic perspective view of the substitute tool in which a portion which finally generates a machining surface is indicated in the first embodiment.

FIG. 23 is a schematic perspective view of the substitute tool when the substitute tool performs the machining of the first time. FIG. 24 is a schematic perspective view of the substitute tool when the substitute tool performs the machining of the second time. FIG. 25 is a schematic perspective view of the substitute tool when the substitute tool performs the machining of the third time. FIG. 23 to FIG. 25 illustrate states when the substitute tool moves in the outward path to form a side surface on one side of a groove portion according to the present embodiment. With reference to FIG. 23, a portion which finally generates a machining surface is also generated in the substitute tool 22. In the machining of the first time by the substitute tool 22, a line 132a of the substitute tool 22 which finally generates the machining surface is formed on an upper area of the groove portion. With reference to FIG. 24, in the machining of the second time by the substitute tool 22, a line 132b of the substitute tool 22 which finally generates the machining surface is formed on a center area of the groove portion. With reference to FIG. 25, in the machining of the third time by the substitute tool 22, a line 132c of the substitute tool 22 which finally generates the machining surface is formed on a lower area of the groove portion.

When the lines 132a, 132b, and 132c, respectively illustrated in FIG. 23 to FIG. 25, which finally generate the machining surface are combined, a line can be formed which corresponds to the line 132 which finally generates the machining surface when the specified tool 81 performs the machining. In the entire depth direction of the groove portion 66, the groove portion can be formed to accurately match the desired shape. In other words, the groove portion can be formed which is approximately identical to the groove portion 66 formed by the specified tool 81.

With reference to FIG. 16 and FIG. 17, next, the position setting unit 60 outputs the output numerical data 62 in step 129. The output numerical data 62 can be set by, for example, the coordinates of the XYZ axes and a relative angle between the substitute tool 22 and the workpiece 1 on the ABC axes.

As described above, the control device 55 of the present embodiment generates the output numerical data 62. The numerical control unit 63 drives the individual axis servomotor 64 based on the output numerical data 62. Accordingly, the position relative to workpiece 1 and the substitute tool 22 can be adjusted.

The control device of the machine tool 10 of the present embodiment comprises the path setting unit. The path setting unit calculates the portion which finally generates the machining surface in the machining area 131 of the specified tool 81 when the specified tool 81 machines the workpiece 1 and sets a tool path of the substitute tool 22 based on the portion which finally generates the machining surface. According to the configuration, the machining can be performed using the substitute tool in place of the specified tool. In addition, the machining can be accurately performed.

The path setting unit 57 further includes the virtual advancing direction setting unit 58 which sets the virtual advancing direction when the specified tool 81 machines the workpiece 1 based on the input numerical data 54, the range setting unit 59 which calculates the portion which finally generates the machining surface using the virtual advancing direction and sets a range in which the substitute tool is disposed based on the portion which finally generates the machining surface, and the position setting unit 60 which sets a plurality of positions on which the substitute tool 22 is disposed within the range in which the substitute tool 22 is disposed. Adopting the configuration makes it possible to set tool paths of the substitute tool 22 for a plurality of times in a simple configuration.

As described above, the tool path generation method of the present embodiment is a generation method of a tool path for calculating a tool path of the substitute tool 22, and a tool path of the specified tool 81 when machining is performed by the specified tool 81 is set in advance. The method includes a tool path calculation step for calculating the tool path of the substitute tool 22 based on the tool path of the specified tool 81 when the machining is performed by the substitute tool 22 different from the specified tool 81. In the tool path calculation step, the portion is calculated which finally generates the machining surface in the machining area of the specified tool 81 when the specified tool 81 machines the workpiece, and the tool path of the substitute tool is set based on the portion which finally generates the machining surface. Adopting the method enables the machining to be performed using the substitute tool in place of the specified tool. In addition, the tool path for accurately performing machining can be generated.

Further, in the tool path generation method, the tool path calculation step includes a step for setting the virtual advancing direction when the specified tool 81 machines the workpiece 1 and a step for calculating the portion which finally generates the machining surface using the virtual advancing direction. Following these steps, the tool path calculation step can include a step for setting the range in which the substitute tool 22 is disposed based on the portion which finally generates the machining surface and a step for setting a plurality of positions on which the substitute tool 22 is disposed within the range in which the substitute tool 22 is disposed.

In the above descriptions of the present embodiment, the CAM apparatus generates the input numerical data when the specified tool is used based on the shape data output from the CAD apparatus. The control device of the machine tool generates the output numerical data to be the tool path of the substitute tool using the input numerical data. However, it is not limited to the above-described embodiment, and the output numerical data can be generated in the CAM apparatus using the shape data output from the CAD apparatus.

Figure 26:
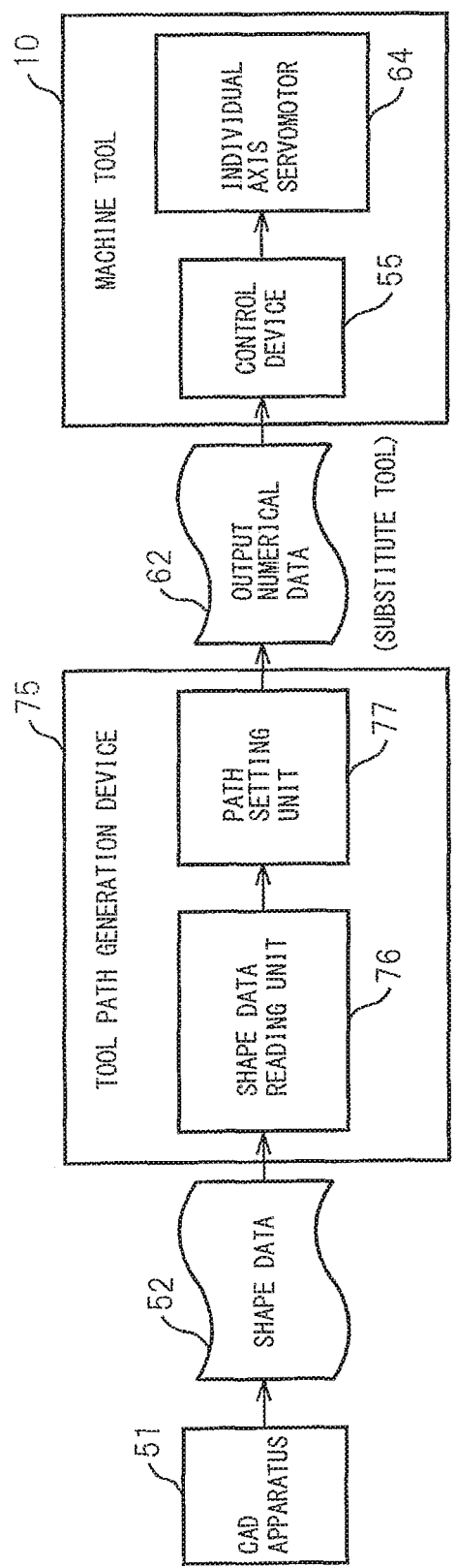
FIG. 26 is a schematic view of another machining system in the first embodiment.

FIG. 26 is a schematic view of a machining system which includes the CAD apparatus and the tool path generation device of the present embodiment. The shape data 52 is generated in the CAD apparatus 51 similar to the machining system illustrated in FIG. 16. A tool path generation device 75 of the present embodiment has functions of the CAM apparatus. The tool path generation device 75 further has a function of generating the output numerical data 62 of the tool path on which machining is performed using the substitute tool based on the shape data 52.

The tool path generation device 75 of the present embodiment comprises a shape data reading unit 76 and a path setting unit 77. The shape data reading unit 76 of the present embodiment reads the shape data 52 after the workpiece 1 is machined. The path setting unit 77 sets a tool path for a relative movement to the direction in which the groove portion 66 extends using the substitute tool 22 having a diameter smaller than that of the specified tool 81 based on the shape data 52 of the workpiece 1.

The path setting unit 77 has functions of, for example, the CAM apparatus 53, the numerical data reading unit 56, and the path setting unit 57 of the machining system illustrated in FIG. 16. The path setting unit 77 generates the input numerical data 54 indicating a path of the specified tool 81 based on, for example, the shape data 52. The path setting unit 77 generates the output numerical data 62 indicating a path of the substitute tool 22 using the input numerical data 54. At that time, the path setting unit 77 can calculate the line 132 which finally generates the machining surface in the machining area 131 of the specified tool 81 and set the tool path of the substitute tool 22 based on the line 132 which finally generates the machining surface.

The output numerical data 62 is input to the machine tool 10. The control device 55 of the machine tool 10 drives the individual axis servomotor 64 using the output numerical data 62. The control device 55 can relatively move the substitute tool 22 to the workpiece 1.

The tool path generation device of the present embodiment can also generates the tool path using the substitute tool in place of the specified tool.

The moving device which relatively moves the substitute tool 22 and the workpiece 1 in the present embodiment is configured to move the substitute tool 22 with respect to the workpiece 1 regarding the X axis and the Y axis, and move the workpiece 1 with respect to the substitute tool 22 regarding the Z axis and the B axis. However, the moving device is not limited to the above-described embodiment as long as the moving device can move at least one of the workpiece and the rotary tool with respect to each axis.

In the present embodiment, the virtual advancing direction of the specified tool is calculated, and a range and a position to which the substitute tool is disposed are set based on the virtual advancing direction. However, it is not limited to the above-described embodiment, and the position on which the substitute tool is disposed may be set without using the virtual advancing direction. For example, the position of the substitute tool may be set by estimating the portion of the specified tool which finally generates the machining surface based on the direction in which the groove portion extends.

In the present embodiment, grooving of a cylindrical cam in which a depth and a groove width of the groove portion are constant is described as an example. However, the present invention is not limited to the above-described embodiment and can be applied to arbitrary machining.

Figure 27:
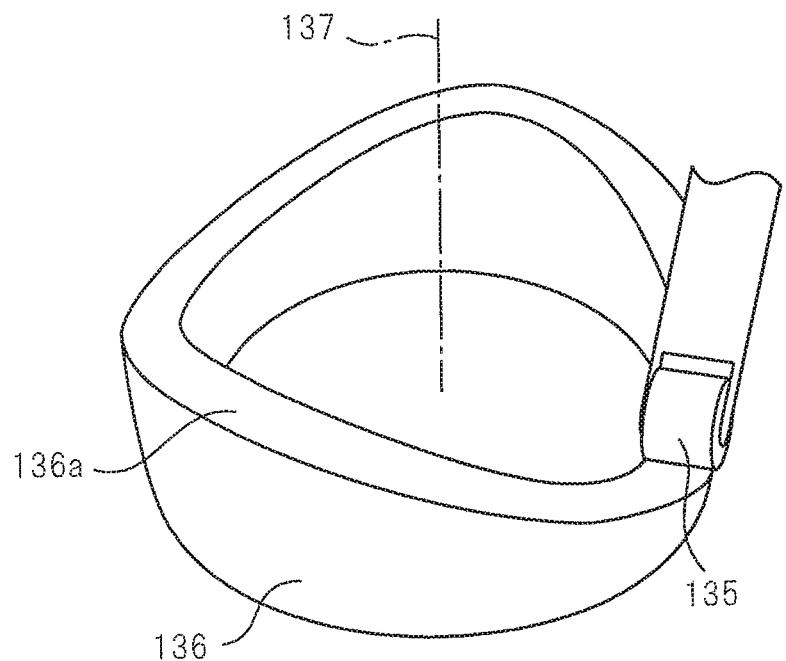
FIG. 27 is a schematic perspective view of an end cam in the first embodiment.

FIG. 27 is a schematic perspective view of an end cam. An end cam 136 includes an end face 136a. The end face 136a is in contact with a cam follower 135. The cam follower 135 is formed in a columnar shape and rotatably supported. The cam follower 135 is in contact with the end face 136a on a circumferential surface thereof. The end cam 136 and the cam follower 135 move by rotating around a central axis 137, so that top and bottom positions of the cam follower 135 can be changed.

In machining of the end face 136a of the end cam 136, it is preferable to use a rotary tool having a tool diameter identical to a diameter of the cam follower 135. It is preferable that a rotation axis of the cam follower 135 when rotating and a rotation axis of the rotary tool match each other to perform machining.

For example, the end face 136a can be formed by rotating a workpiece around the central axis 137 to perform cutting using an end mill having a diameter identical to the diameter of the cam follower 135. According to the above-described method, the end face 136a having a desired shape can be formed.

On the other hand, when a rotary tool having a tool diameter different from the diameter of the cam follower 135 is used as the rotary tool to machine the end face 136a, the end face 136a may not be a smooth surface. Accordingly, when the end cam 136 is driven, movement of the cam follower 135 may not be smooth.

However, it is sometimes difficult to prepare a rotary tool having a tool diameter identical to the diameter of the cam follower 135. Thus, when an end mill having a diameter smaller than, for example, a desired tool diameter is used, an eccentric holder, which revolves the end mill while rotating it, is used. However, there is a need to prepare the eccentric holder, and it may elongate a machining time.

When such an end face 136a of the end cam 136 is manufactured, a method and a device similar to grooving in the present embodiment can be applied to. In other words, the end face 136a of the end cam 136 can be formed similar to a side surface of a groove portion. For example, machining can be performed using a rotary tool having a diameter smaller than the diameter of the cam follower 135 while rotating the end cam 136 around the central axis 137.

In this case, a rotary tool having a tool diameter identical to the diameter of the cam follower 135 can be specified as a specified tool. In addition, a rotary tool having a tool diameter smaller than the diameter of the cam follower 135 can be specified as a substitute tool. A portion of the specified tool which finally generates a machining surface is calculated, and a tool path of the substitute tool is calculated based on the portion which finally generates the machining surface. The substitute tool performs the machining using the calculated tool path and can form a smooth end face 136a. Adopting the method and the device in the present embodiment makes it possible to machine the end face 136a into a desired shape. Accordingly, movement of the cam follower 135 can be smooth.

Figure 28:
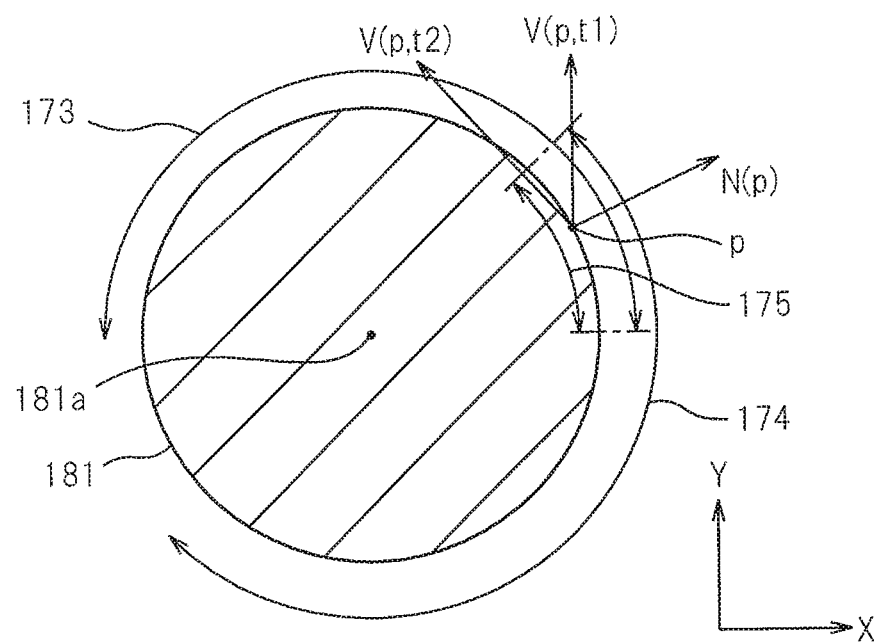
FIG. 28 is a view illustrating a portion which finally generates a machining surface.

FIG. 28 is a schematic diagram illustrating a portion of a tool which finally generates a machining surface when various workpieces are machined. FIG. 28 is a schematic cross-sectional view of an example of a tool 181 having a circular cross sectional shape. The tool 181 rotates around a tool center point 181a. A surface of the tool 181 machines a workpiece. On the surface of the tool 181, a portion which finally generates a machining surface can be calculated by the following method.

An arbitrary point p is set on the surface of the tool 181. A normal direction of the surface of the tool 181 on the point p is set as N(p). A virtual advancing direction on the point p at a predetermined time t1 is set as V(p, t1). A virtual advancing direction on the point p at a time t2 later than the time t1 is set as V(p, t2). In this case, in machining performed in a period from the time t1 to the time t2, the portion of the tool 181 which finally generates the machining surface is defined by the following expression. In the following expression, an inner product of N(p) and V(p, t1) and an inner product of N(p) and V(p, t2) are used.

$$N(p) \cdot V(p, t1) \geq 0 \quad (1)$$

$$N(p) \cdot V(p, t2) \leq 0 \quad (2)$$

The mathematical symbol "·" indicates an inner product. An area satisfying both of the above expressions (1) and (2) corresponds to the portion which finally generates the machining surface in the period from the time t1 to the time t2. In FIG. 28, an area satisfying the above expression (1) is indicated by an arrow 173. An area satisfying the above expression (2) is indicated by an arrow 174. An area indicated by an arrow 175, where the area indicated by the arrow 173 and the area indicated by the arrow 174 overlap with each other, corresponds to the portion which finally generates the machining surface. For example, a plurality of points p is generated on an entire surface of the tool 181, and a portion where the points p satisfying the above-described expressions (1) and (2) exist is the portion which finally generates the machining surface.

The estimation of the portion which finally generates the machining surface based on the expressions (1) and (2) is not limited to a tool having a circular cross sectional shape and can be applied to a tool having an arbitrary shape. In addition, a machining shape of a workpiece is not limited to a groove, and an arbitrary shape can be adopted.

The numerical control-type machine tool of the present embodiment includes one rotational feed axis and a plurality of linear feed axes. However, the present invention is not limited to the above-described embodiment and can be applied to numerical control-type machine tools performing arbitrary machining. Further, the specified tool and the substitute tool of the present embodiment are flat end mills. In other words, the substitute tool of the present embodiment is a similar type tool to the specified tool. However, the substitute tool is not limited to the above-described embodiment and may be a different type of tool from the specified tool. Further, when a tool other than the rotary tool is used, an instruction regarding a rotation phase of the spindle may be added to a setting of a tool position.

In the machining of the present embodiment, a feed rate for relatively advancing a rotary tool to a workpiece while rotating the rotary tool is approximately constant. However, the feed rate is not limited to the above-described embodiment and may be changed depending on a cutting amount of the workpiece. The above-described control can shorten a machining time and elongate a tool life.

Second Embodiment

A tool path generation method, a control device of a machine tool, and a tool path generation device according to the second embodiment are described with reference to FIG. 29 to FIG. 37. Processing in the present embodiment, a recess portion is generated on a surface of a workpiece. In the present embodiment, a specified tool is also specified in advance, and a substitute tool is used in actual machining in place of the specified tool.

Figure 29:
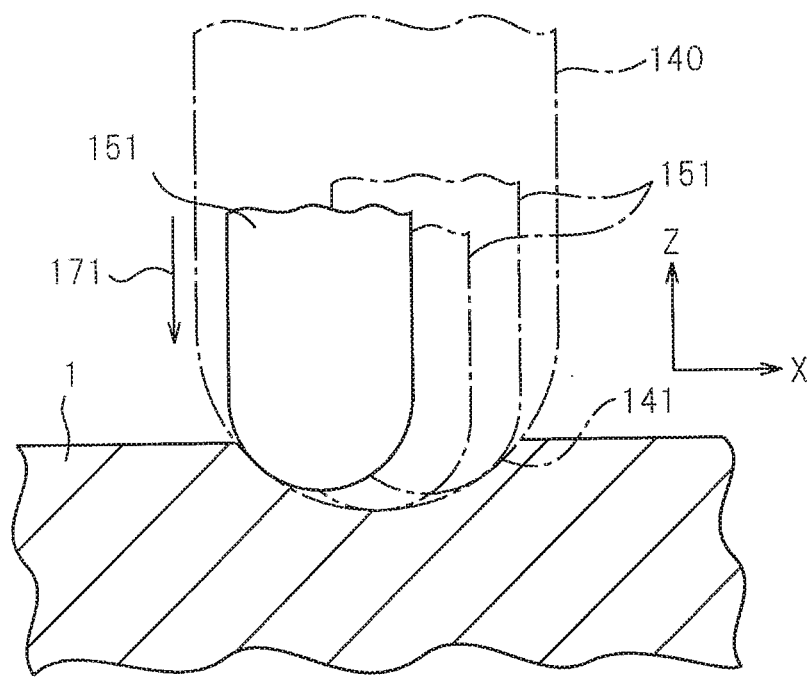
FIG. 29 is a schematic cross-sectional view of a workpiece when machining is performed by a substitute tool in a second embodiment.
Figure 30:
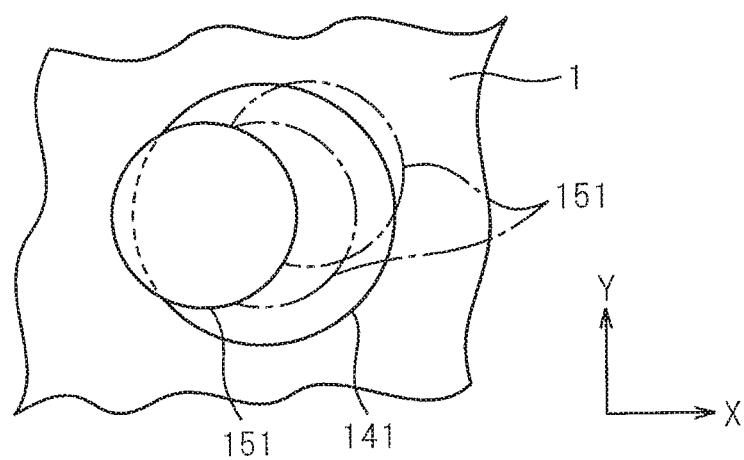
FIG. 30 is a schematic plan view of a workpiece when machining is performed by the substitute tool in the second embodiment.

FIG. 29 is a schematic cross-sectional view of a workpiece when machining is performed by a substitute tool 151 according to the present embodiment. FIG. 30 is a schematic plan view of the workpiece 1 when machining is performed by the substitute tool 151 according to the present embodiment. FIG. 29 illustrates a specified tool 140 in addition to the substitute tool 151. With reference to FIG. 29 and FIG. 30, a recess portion 141 having a circular arc cross sectional shape is formed on a surface of the workpiece 1 in the present embodiment. The surface of the workpiece 1 of the present embodiment is a planar shape. As a tool to cut the workpiece 1, a ball end mill having a hemispherical tip end is used. The substitute tool 151 forms the recess portion 141 by performing machining for a plurality of times.

Figure 31:
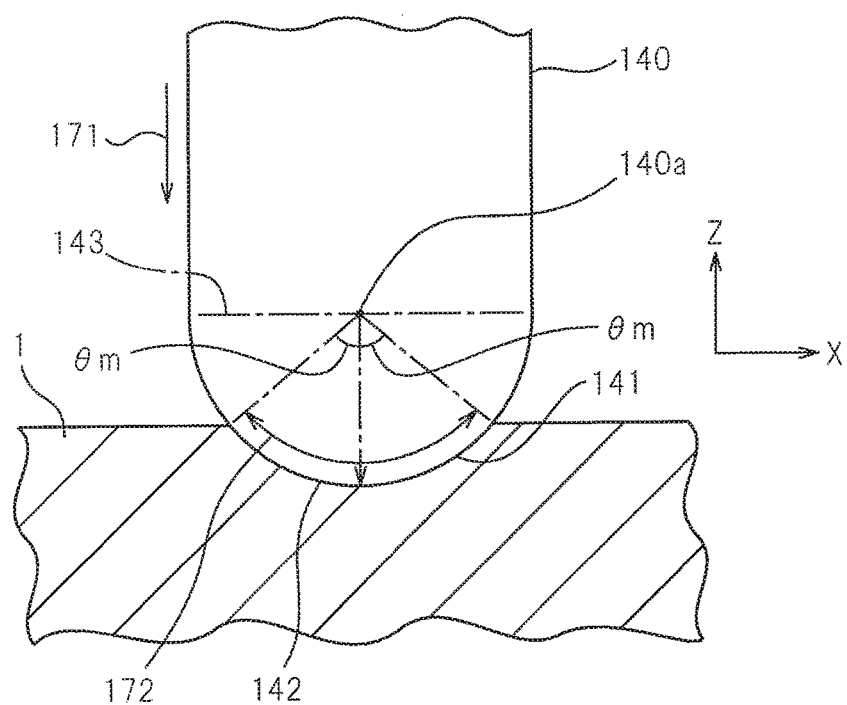
FIG. 31 is a schematic cross-sectional view of a workpiece when machining is performed by a specified tool in the second embodiment.
Figure 32:
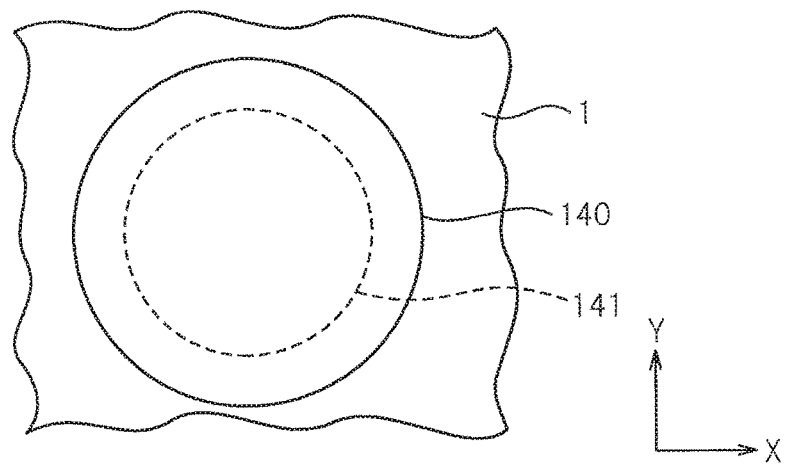
FIG. 32 is a schematic plan view of a workpiece when machining is performed by the specified tool in the second embodiment.

FIG. 31 is a schematic cross-sectional view illustrating when the recess portion is formed on the workpiece using the specified tool 140. FIG. 32 is a schematic plan view illustrating when the recess portion is formed on the workpiece using the specified tool 140. In the present embodiment, the specified tool 140 is also an optimum tool to form a desired recess portion 141. The specified tool 140 is a ball end mill. A shape of a tip end portion of the specified tool 140 matches with a shape of the desired recess portion 141. Thus, as indicated by an arrow 171, when the specified tool 140 is moved to a direction for approaching the workpiece 1 while rotating and is pressed against the workpiece 1, the recess portion 141 having a desired shape can be formed. In other words, the workpiece 1 is cut by a part of a hemispherical portion on the tip end of the specified tool 140, and the recess portion 141 can be formed.

With reference to FIG. 29 and FIG. 30, in the present embodiment, the substitute tool 151 is used in place of the specified tool 140. The substitute tool 151 is a ball end mill having a tool diameter smaller than that of the specified tool 140. In other words, the substitute tool 151 is a tool which is the same type as that of the specified tool 140 and smaller than the specified tool 140.

In the present embodiment, a tool path of the substitute tool 151 is also set so as to form a machining surface of the workpiece 1 into a desired shape. Similar to the first embodiment, the tool path of the substitute tool 151 is set based on a portion of the specified tool 140 which finally generates a machining surface. In the present embodiment, the portion of the specified tool 140 which finally generates the machining surface is also calculated, and a range in which the substitute tool 151 is disposed is set based on the portion which finally generates the machining surface. Further, a position on which the substitute tool 151 is disposed is set within the range.

In the present embodiment, the machining can also be performed using the machine tool described in the first embodiment. With reference to FIG. 1, in the present embodiment, the substitute tool 151 is attached in place of the substitute tool 22. The workpiece 1 is fixed to the rotary table 42. After setting positions in the X-axis direction and the Y-axis direction, and around the B axis of the substitute tool 151 to the workpiece 1, the substitute tool 151 is fixed not to move in the X-axis direction and the Y-axis direction, and around the B axis. In the state, the substitute tool 151 is relatively moved to the workpiece 1 in the Z-axis direction. In the present embodiment, the workpiece 1 is moved in the Z-axis direction, and thus the substitute tool 151 can be moved to a direction for approaching the workpiece 1.

In the present embodiment, the machining can also be performed using the machining system illustrated in FIG. 16 and the control illustrated in FIG. 17 of the first embodiment. With reference to FIG. 16 and FIG. 17, the input numerical data 54 when the specified tool 140 is used is generated by the CAD apparatus 51 and the CAM apparatus 53.

Next, the numerical data reading unit 56 reads the input numerical data 54. The numerical data reading unit 56 outputs the coordinate value sequence. Next, the virtual advancing direction setting unit 58 reads the machine tool data. The virtual advancing direction setting unit 58 calculates the virtual advancing direction. In the present embodiment, the substitute tool 151 does not move in the X-axis direction and the Y-axis direction, and around the B axis during a machining period, and thus the virtual advancing direction is a direction that the substitute tool 151 is relatively moved to the workpiece 1 in the Z-axis direction. With reference to FIG. 31, the virtual advancing direction of the specified tool 140 is indicated by the arrow 171.

Next, the range setting unit 59 reads the machining setting data. The machining setting data of the present embodiment includes a diameter in a plane view of the recess portion 141, a depth of the recess portion 141, the tool diameter of the substitute tool 151, and the like. Next, the range in which the substitute tool 151 is disposed is calculated. In the present embodiment, an area forming the recess portion 141 on the tip end of the specified tool 140 is the range in which the substitute tool 151 is disposed. With reference to FIG. 31, a ball end mill includes a boundary 143 between a hemispherical portion on a tip end and a cylindrical portion. In the present embodiment, a center of a circle forming the hemispherical tip end of the tool is referred to as a tool center 140a. The virtual advancing direction is parallel to a direction to which the central axis of the specified tool 140 extends, as indicated by the arrow 171.

At the tool center 140a, an angle θm to the virtual advancing direction is calculated based on a shape of the recess portion 141. A surface of the specified tool 140 within a range of the calculated angle θm is indicated by an arrow 172. The range indicated by the arrow 172 is the portion of the specified tool 140 which finally generates the machining surface. In the present embodiment, the portion of the specified tool 140 which finally generates the machining surface is configured by a plane. Further, in the present embodiment, the portion of the specified tool 140 which finally generates the machining surface is the range in which the substitute tool 151 is disposed.

In the present embodiment, the virtual advancing direction is calculated, and the portion which finally generates the machining surface is calculated based on the virtual advancing direction. However, it is not limited to the above-described embodiment, and the portion which finally generates the machining surface may be calculated without using the virtual advancing direction.

With reference to FIG. 16 and FIG. 17, next, the position setting unit 60 reads the machining setting data including a scallop height and the like. The position setting unit 60 further sets the position on which the substitute tool 151 is disposed.

Figure 33:
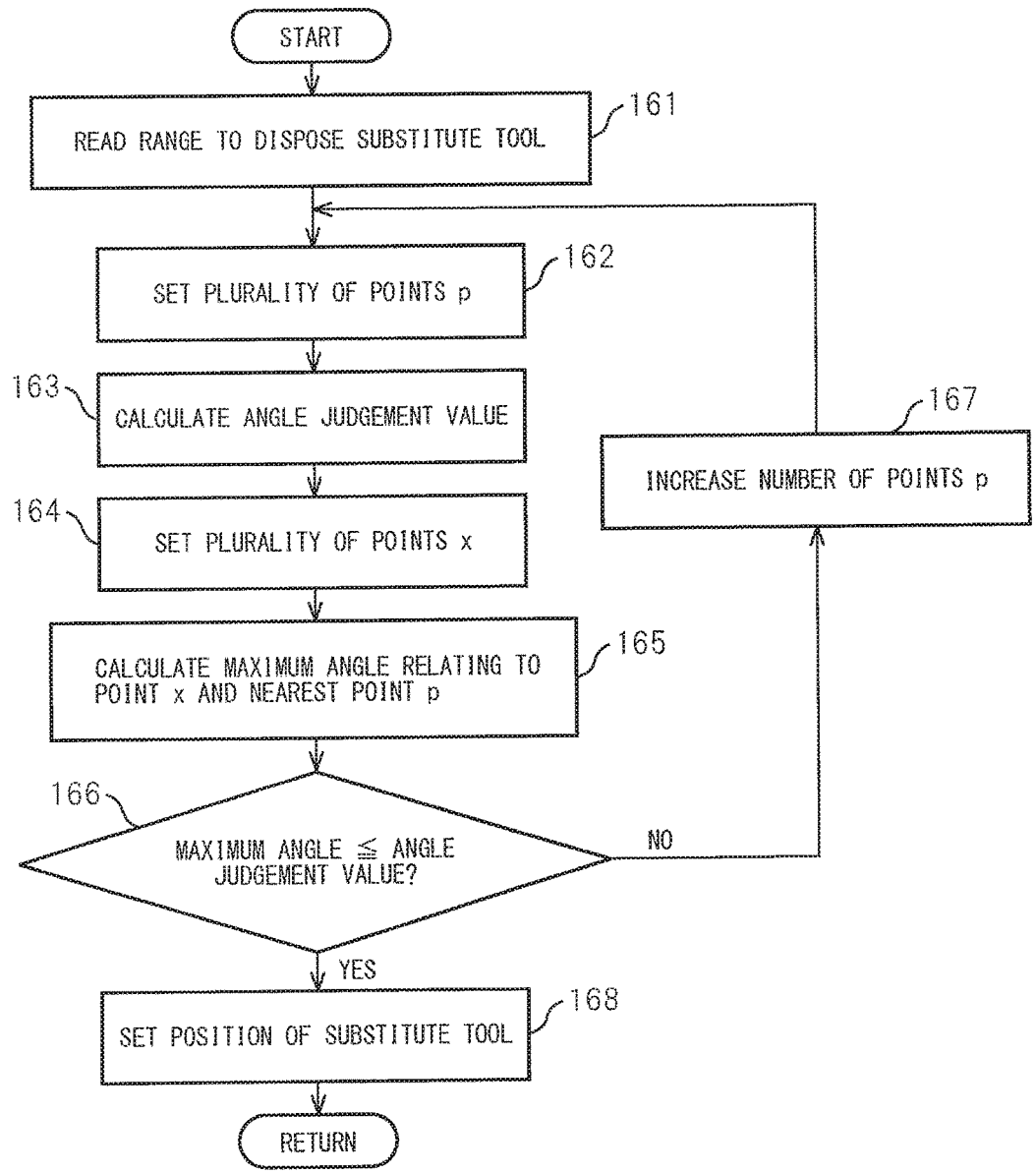
FIG. 33 is a flowchart illustrating control for setting a position on which the substitute tool is disposed in the second embodiment.
Figure 34:
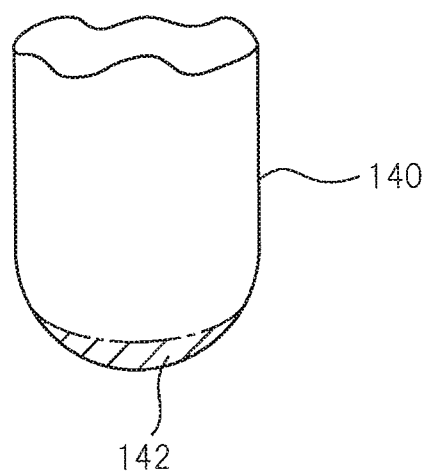
FIG. 34 is a schematic perspective view of the specified tool in the second embodiment.

FIG. 33 is a flowchart illustrating control for setting the position on which the substitute tool 151 is disposed in the present embodiment. In step 161, the range in which the substitute tool 151 is disposed is read. FIG. 34 is a schematic perspective view of the specified tool 140. A part of the tip end of the specified tool 140 is the portion which finally generates the machining surface and equivalent to a range 142 in which the substitute tool 151 is disposed.

With reference to FIG. 33, next, in step 162, a plurality of points p is set on the portion which finally generates the machining surface. The points p are points to contact with the substitute tool 151 later.

Figure 35:
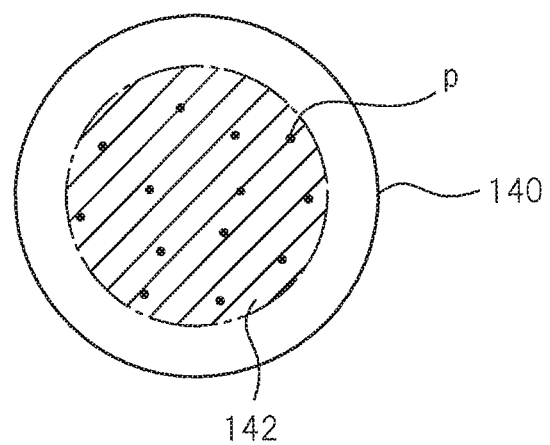
FIG. 35 is a schematic bottom view of the specified tool in the second embodiment.

FIG. 35 is a schematic view of the specified tool 140 seen from the tip end. In other words, FIG. 35 is a bottom view of the specified tool 140. The range 142 in which the substitute tool 151 is disposed is set to a central part of the specified tool 140. The plurality of points p is set within the range 142. A plurality of predetermined numbers of points p can be set. In the setting of the points p, the points p are generated, for example, at irregular positions. Then, the points p can be moved so that intervals between the points p become as even as possible by using a simulation apparatus. For example, regarding an arbitrary point p, a repulsive force is applied to intervals between other points or a boundary of the range 142. The point p can be moved by setting so that a greater force is applied as the distance is smaller. The above-described simulation is continued for a predetermined time period, and a state becomes in approximate equilibrium. All of the points p can be disposed approximately evenly.

Next, it is determined whether the scallop height is an allowable value or less when the substitute tool 151 is brought into contact with the set point p. In the present embodiment, the number of positions on which the substitute tool 151 is disposed is set so that the scallop height of the recess portion 141 is a predetermined allowable value or less.

Figure 36:
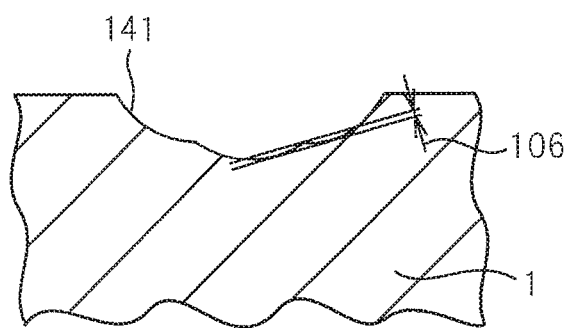
FIG. 36 is a schematic view illustrating a scallop height when a workpiece is machined in the second embodiment.

FIG. 36 is a schematic cross-sectional view illustrating the scallop height according to the present embodiment. In the present embodiment, irregularity is generated on a surface of the recess portion 141 depending on the number of positions on which the substitute tool 151 is disposed. A height indicated by the arrow 106 is the scallop height. In the present embodiment, the scallop height can also be reduced by increasing the number of positions on which the substitute tool 151 is disposed. In the present embodiment, the scallop height after machining is determined using an angle around the tool center 140a of the specified tool 140.

Figure 37:
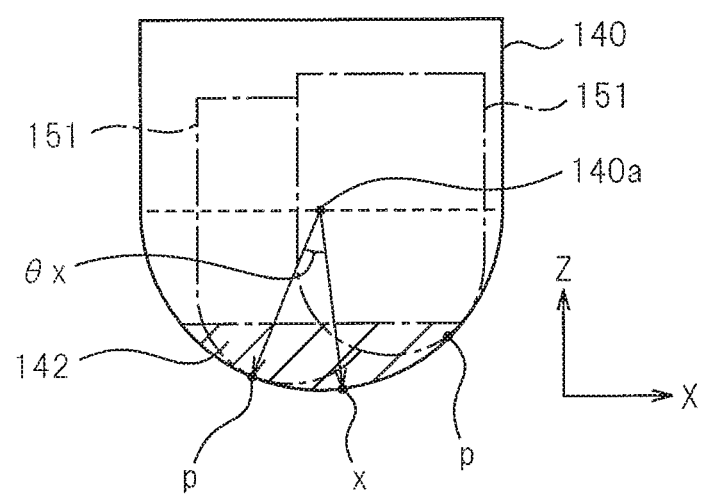
FIG. 37 is a view illustrating judgment of a scallop height in the second embodiment.

FIG. 37 is a schematic view illustrating the specified tool 140 and the substitute tool 151 according to the present embodiment. The points p are points which are randomly set in step 162 and in contact with the substitute tool 151. An arbitrary point x different from the point p is set in the range 142 in which the substitute tool 151 is disposed. A plurality of points x is set. From the plurality of points p, one of the point p nearest to the points x can be selected. In this case, an angle $\theta x$ between a line connecting the tool center 140a and the point p and a line connecting the tool center 140a and the point x can be calculated. The smaller a maximum value of a distance between the point x and the point p is at the plurality of points x, the smaller the scallop height becomes. Thus, when many points x are generated, and the angles $\theta x$ regarding all of the points x are a predetermined allowable angle or less, the scallop height can be the allowable value or less.

With reference to FIG. 33, in step 163, an angle judgment value is calculated. The angle judgment value can be calculated based on an allowable value H of the scallop height, a tool diameter R of the specified tool, and a tool diameter r of the substitute tool, which are criteria of judgment.

Next, in step 164, the point x is generated within the range 142 in which the substitute tool is disposed. In the present embodiment, a predetermined number of the points x is generated. Regarding the setting of the point x, a method similar to the setting of the position of the point p can be adopted.

Next, in step 165, the angle $\theta x$ relating to the point x and the point p nearest to the point x is calculated. The calculation is executed on all of the points x. A maximum angle $\theta x max$ is selected from a plurality of calculated angles $\theta x$.

Next, in step 166, it is determined whether the calculated maximum angle $\theta x max$ is the angle judgment value or less. In step 166, when the calculated maximum angle $\theta x max$ is greater than the angle judgment value, it can be determined that a generated scallop height becomes larger than the allowable value. In this case, the processing is shifted to step 167. In step 167, the number of points p is increased. For example, a predetermined number of points is added to the number of current points p. Then, the processing returns to step 162, and the positions of the points p are newly set. As described above, the control to increase the number of positions on which the substitute tool is disposed is performed until the scallop height of the recess portion becomes the allowable value or less.

In step 166, when the calculated maximum angle is the angle judgment value or less, it can be determined that the scallop height is the allowable value or less. In other words, it can be determined that a desired scallop height is achieved. In this case, the processing is shifted to step 168.

In step 168, the position of the substitute tool 151 is set. The substitute tool 151 is set to be in contact with the point p. The point p is set on a surface of the portion which finally generates the machining surface. In the present embodiment, positions of the X-axis direction, the Y-axis direction, and the Z-axis direction are set. As described above, the position on which the substitute tool 151 is disposed can be set. The machine tool of the present embodiment can set the number of position to dispose the substitute tool 151 within the range in which the substitute tool 151 is disposed so that the scallop height is a desired height or less.

With reference to FIG. 16 and FIG. 17, next, the position setting unit 60 can generate the output numerical data 62 based on the calculated position of the substitute tool 151. The output numerical data 62 includes the tool path of the substitute tool 151. Next, similar to the first embodiment, the numerical control unit 63 can drive the individual axis servomotor 64 based on the output numerical data 62.

Similar to the tool path generation method of the first embodiment, the tool path generation method of the present embodiment includes the tool path calculation step for calculating the tool path of the substitute tool 151. In the tool path calculation step, the portion which finally generates the machining surface can be calculated in the machining area of the specified tool 140 when the specified tool 140 machines the workpiece 1, and the tool path of the substitute tool 151 can be set based on the portion which finally generates the machining surface.

In the tool path generation device of the present embodiment, the tool path of the substitute tool 151 can also be formed similar to the tool path generation device of the first embodiment. With reference to FIG. 26, the tool path generation device 75 reads the shape data of the workpiece 1 by the shape data reading unit 76. Next, the path setting unit 77 can set the tool path of the substitute tool 151 when the substitute tool 151 performs the machining which is different from the specified tool 140 specified in advance. In this case, the path setting unit 77 can set the tool path of the specified tool 140 when the workpiece 1 is machined by the specified tool 140, calculate the portion which finally generates the machining surface in the machining area of the specified tool 140 when the specified tool 140 performs the machining, and set the tool path of the substitute tool 151 based on the portion which finally generates the machining surface.

The other configurations, functions, and effects are similar to those in the first embodiment, and the descriptions thereof are not repeated.

The above-described embodiments can be appropriately combined with each other. In the above-described drawings, the same reference numerals are attached to the same or corresponding portions. The above-described embodiments are merely examples and are in no way intended to limit the invention. Further, the above-described embodiments include modifications indicated in the scope of claims.

REFERENCE SIGNS LIST 1 workpiece
10 machine tool
20 spindle
22, 151 substitute tool
55 control device
57 path setting unit
58 virtual advancing direction setting unit
59 range setting unit
60 position setting unit
75 tool path generation device
76 shape data reading unit 77 path setting unit
81, 140 specified tool

The invention claimed is:

1. A tool path generation method for calculating a tool path for machining a workpiece while moving a tool and the workpiece relative to each other, the method comprising:
setting in advance a tool path of a specified tool assuming that the specified tool is used in machining;
calculating a contact portion of a surface of the specified tool, which would be in contact with a machined surface of the workpiece if the specified tool were to machine the workpiece; and
calculating a tool path of a substitute tool, which is different from the specified tool, based on the tool path of the specified tool, the calculating of the tool path of the substitute tool comprising setting a position of the substitute tool relative to the specified tool in the tool path of the specified tool so that a surface of the substitute tool and the contact portion of the surface of the specified tool make a contact and comprising following the tool path of the specified tool multiple times so that the contact between the contact portion of the surface of the specified tool and the surface of the substitute tool is increased; and
machining the workpiece using the tool path of the substitute tool, instead of the tool path of the specified tool, as the tool path for machining.

2. The tool path generation method of claim 1, wherein the contact portion of the surface of the specified tool includes a line portion or a plane portion.

3. The tool path generation method of claim 1, wherein machining is performed using the substitute tool which is a same type of tool as the specified tool and is smaller than the specified tool.

4. The tool path generation method of claim 1, wherein the tool path calculation step comprises:
a step for setting a virtual advancing direction assuming that the specified tool machines the workpiece;
a step for calculating the contact portion using the virtual advancing direction;
a step for setting a range in which the substitute tool is disposed based on the contact portion; and
a step for setting a plurality of positions on which the substitute tool is disposed within the range in which the substitute tool is disposed.

5. A control device of a machine tool which machines a workpiece while moving a tool and the workpiece relative to each other, the control device of the machine tool comprising:
an input information reading unit configured to read input information including a tool path of a specified tool assuming that the specified tool, which is specified in advance, performs machining; and
a path setting unit configured to: calculate a contact portion of a surface of the specified tool, which would be in contact with a machined surface of the workpiece if the specified tool were to machine the workpiece,
calculate a tool path of a substitute tool, which is different from the specified tool, based on the tool path of the specified tool, and
set the tool path of the substitute tool, instead of the tool path of the specified tool, as the tool path for marching,
wherein the calculating of the tool path of the substitute tool comprises setting a position of the substitute tool relative to the specified tool in the tool path of the specified tool so that a surface of the substitute tool and the contact portion of the surface of the specified tool make a contact, and comprising following the tool path of the specified tool multiple times so that the contact between the contact portion of the surface of the specified tool and the surface of the substitute tool is increased.

6. The control device of the machine tool of claim 5, wherein the contact portion of the surface of the specified tool includes a line portion or a plane portion.

7. The control device of the machine tool of claim 5, wherein the substitute tool is a same type of tool as the specified tool and further is smaller than the specified tool.

8. The control device of the machine tool of claim 5, wherein the path setting unit comprises:
a virtual advancing direction setting unit configured to set a virtual advancing direction based on the input information assuming that the specified tool machines the workpiece;
a range setting unit configured to calculate the contact portion using the virtual advancing direction and set a range in which the substitute tool is disposed based on the contact portion; and
a position setting unit configured to set a plurality of positions on which the substitute tool is disposed within the range in which the substitute tool is disposed.

9. A tool path generation device which generates a tool path when a workpiece is machined while moving a tool and the workpiece relative to each other, the tool path generation device comprising:
a shape data reading unit configured to read shape data of the workpiece; and
a path setting unit configured to:
set a tool path of a specified tool assuming that the specified tool machines the workpiece,
calculate a contact portion of a surface of the specified tool, which would be in contact with a machined surface of the workpiece if the specified tool were to machine the workpiece, and
calculate a tool path of a substitute tool, which is different from the specified tool, based on the shape data, and
set the tool path of the substitute tool, instead of the tool path of the specified tool, as the tool path for machining;
wherein the calculating of the tool path of the substitute tool comprises setting a position of the substitute tool relative to the specified tool in the tool path of the specified tool so that a surface of the substitute tool and the contact portion of the surface of the specified tool make a contact, and comprising following the tool path of the specified tool multiple times so that the contact between the contact portion of the surface of the specified tool and the surface of the substitute tool is increased.

* * * * *